United States Patent
Carlini et al.

(10) Patent No.: US 7,465,348 B1
(45) Date of Patent: *Dec. 16, 2008

(54) NANOSIZED PARTICLES OF MONOAZO LAKED PIGMENT

(75) Inventors: Rina Carlini, Mississauga (CA); C. Geoffrey Allen, Waterdown (CA); Sandra J. Gardner, Oakville (CA); Karl W. Dawson, Ottawa (CA); Peter G. Odell, Mississauga (CA); Paul F. Smith, Oakville (CA); Jennifer L. Belelie, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/759,913

(22) Filed: Jun. 7, 2007

(51) Int. Cl.
C09B 67/20 (2006.01)
C09B 63/00 (2006.01)
C09B 41/00 (2006.01)
C09D 11/00 (2006.01)
C09D 11/02 (2006.01)

(52) U.S. Cl. .............. 106/496; 106/31.61; 106/31.62; 106/31.65; 106/31.66; 106/31.67; 106/31.72; 106/31.73; 106/31.75; 106/31.8; 523/161; 534/579

(58) Field of Classification Search .............. 106/31.61, 106/31.62, 31.65, 31.66, 31.67, 31.72, 31.73, 106/31.75, 31.8, 402, 496; 523/161; 534/579
See application file for complete search history.

(56) References Cited

U.S. PATENT DOCUMENTS

| 4,830,671 | A | 5/1989 | Frihart et al. |
|---|---|---|---|
| 4,889,560 | A | 12/1989 | Jaeger et al. |
| 4,889,761 | A | 12/1989 | Titterington et al. |
| 5,194,638 | A | 3/1993 | Frihart et al. |
| 5,278,020 | A | 1/1994 | Grushkin et al. |
| 5,290,654 | A | 3/1994 | Sacripante et al. |
| 5,308,734 | A | 5/1994 | Sacripante et al. |
| 5,344,738 | A | 9/1994 | Kmiecik-Lawrynowicz et al. |
| 5,346,797 | A | 9/1994 | Kmiecik-Lawrynowicz et al. |
| 5,364,729 | A | 11/1994 | Kmiecik-Lawrynowicz et al. |
| 5,370,963 | A | 12/1994 | Patel et al. |
| 5,372,852 | A | 12/1994 | Titterington et al. |
| 5,403,693 | A | 4/1995 | Patel et al. |
| 5,418,108 | A | 5/1995 | Kmiecik-Lawrynowicz et al. |
| 5,597,856 | A | 1/1997 | Yu et al. |
| 5,679,138 | A | 10/1997 | Bishop et al. |
| 5,997,628 | A * | 12/1999 | Bindra .................. 106/496 |
| 6,174,937 | B1 | 1/2001 | Banning et al. |
| 6,399,713 | B1 | 6/2002 | MacQueen et al. |
| 6,492,458 | B1 | 12/2002 | Pavlin et al. |
| 6,537,364 | B2 | 3/2003 | Dietz et al. |
| 6,837,918 | B2 | 1/2005 | Pozarnsky et al. |
| 6,989,055 | B2 * | 1/2006 | Kitamura et al. ............ 106/402 |
| 2003/0065084 | A1 | 4/2003 | MacQueen et al. |
| 2003/0199608 | A1 | 10/2003 | Kamigaki et al. |
| 2005/0109240 | A1 | 5/2005 | Maeta et al. |
| 2006/0063873 | A1 | 3/2006 | Lin et al. |
| 2007/0012221 | A1 | 1/2007 | Maeta et al. |
| 2007/0120921 | A1 | 5/2007 | Carlini et al. |
| 2007/0120924 | A1 | 5/2007 | Odell et al. |

FOREIGN PATENT DOCUMENTS

| GB | 2 238 792 | 6/1991 |
|---|---|---|
| JP | 2005238342 A2 | 9/2005 |
| JP | 2007023168 | 2/2007 |
| JP | 2007023169 | 2/2007 |
| WO | 2004/026967 | 4/2004 |
| WO | 2006/005521 | 1/2006 |
| WO | 2006/005536 | 1/2006 |
| WO | 2006/011467 | 2/2006 |
| WO | 2006/024103 | 3/2006 |
| WO | 2006/132443 | 12/2006 |

OTHER PUBLICATIONS

U.S. Appl. No. 11/759,906, filed Jun. 7, 2007.
Hideki Maeta et al., "New Synthetic Method of Organic Pigment Nano Particle by Micro Reactor System," http://aiche.comfex.com/aiche/s06/preliminaryprogram/abstract_40072.htm (date unknown).
K. Balakrishnan et al., "Effect of Side-Chain Substituents on Self-Assembly of Perylene Diimide Molecules: Morphology Control," *J. Am. Chem. Soc.*, vol. 128, p. 7390-98 (2006), no month.
Kazuyuki Hayashi et al., "Uniformed nano -downsizing of organic pigments through core-shell structuring," Journal of Materials Chemistry, 17(6), 527-530 (2007), no month.
Kento Ujiiye-Ishii et al., "Mass-Production of Pigment Nanocrystals by the Reprecipitation Method and their Encapsulation," *Molecular Crystals and Liquid Crystals*, v. 445, p. 177 (2006), no month.

* cited by examiner

*Primary Examiner*—Anthony J Green
(74) *Attorney, Agent, or Firm*—Oliff & Berridge, PLC

(57) ABSTRACT

A nanoscale pigment particle composition includes an organic monoazo laked pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized pigment particles.

32 Claims, 1 Drawing Sheet

NANOSIZED PARTICLES OF MONOAZO LAKED PIGMENT

TECHNICAL FIELD

This disclosure is generally directed to nanoscale pigment particle compositions, and methods for producing such nanoscale pigment particle compositions, as well as to uses of such compositions, for example, in ink compositions. More specifically, this disclosure is directed to organic mono-azo laked nanoscale pigments. Such particles are useful, for example, as nanoscopic colorants for such compositions as inks, toners and the like.

CROSS-REFERENCE TO RELATED APPLICATIONS

Disclosed in commonly assigned U.S. patent application Ser. No. 11/759,906 to Maria Birau et al. filed concurrently herewith is a nanoscale pigment particle composition, comprising: a quinacridone pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized particles. Also disclosed is a process for preparing nanoscale quinacridone pigment particles, comprising: preparing a first solution comprising: (a) a crude quinacridone pigment including at least one functional moiety and (b) a liquid medium; preparing a second solution comprising: (a) a sterically bulky stabilizer compound having one or more functional groups that associate non-covalently with the functional moiety, and (b) a liquid medium; combining the first reaction mixture into the second reaction mixture to form a third solution and effecting a direct coupling reaction which forms a quinacridone pigment composition wherein the functional moiety associates non-covalently with the functional group and having nanoscale particle size. Still further is disclosed a process for preparing nanoscale quinacridone pigment particles, comprising: preparing a first solution comprising a quinacridone pigment including at least one functional moiety in an acid; preparing a second solution comprising an organic medium and a sterically bulky stabilizer compound having one or more functional groups that associate non-covalently with the functional moiety of the pigment; treating the second solution containing with the first solution; and precipitating quinacridone pigment particles from the first solution, wherein the functional moiety associates non-covalently with the functional group and the quinacridone pigment particles have a nanoscale particle size.

The entire disclosure of the above-mentioned application is totally incorporated herein by reference.

BACKGROUND

Pigments are a class of colorants useful in a variety of applications such as, for example, paints, plastics and inks. Dyes have typically been the colorants of choice for inkjet printing inks because they are readily soluble colorants which enable jetting of the ink. Dyes have also offered superior and brilliant color quality with an expansive color gamut for inks, when compared with conventional pigments. However, since dyes are molecularly dissolved in the ink vehicle, they are often susceptible to unwanted interactions that lead to poor ink performance, for example photooxidation from light (will lead to poor lightfastness), dye diffusion from the ink into paper or other substrates (will lead to poor image quality and showthrough), and the ability for the dye to leach into another solvent that makes contact with the image (will lead to poor water/solventfastness). In certain situations, pigments are the better alternative as colorants for inkjet printing inks since they are insoluble and cannot be molecularly dissolved within the ink matrix, and therefore do not experience colorant diffusion. Pigments are also significantly less expensive than dyes, and so are attractive colorants for use in all printing inks.

Key issues with using pigments for inkjet inks are their large particle sizes and wide particle size distribution, the combination of which can pose critical problems with reliable jetting of the ink (i.e. inkjet nozzles are easily blocked). Pigments are rarely obtained in the form of single crystal particles, but rather as large aggregates of crystals and with wide distribution of aggregate sizes. The color characteristics of the pigment aggregate can vary widely depending on the aggregate size and crystal morphology. Thus, there is a need addressed by embodiments of the present invention, for smaller pigment particles that minimize or avoid the problems associated with conventional pigment particles. The present nanosized pigment particles are useful in for example paints, coatings and inks (e.g., inkjet printing inks) and other compositions where pigments can be used such as plastics, optoelectronic imaging components, photographic components and cosmetics.

A printing ink is generally formulated according to strict performance requirements demanded by its intended market application and desired properties. Whether formulated for office printing or for production printing, a particular ink is expected to produce images that are robust and durable under stress conditions, such as exposure to abrasive or sharp objects or actions that produce a crease defect in the image (such as folding or scratching the imaged paper). For example, in a typical design of a piezoelectric ink jet device, the image is applied by jetting appropriately colored inks during four to six rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot melt inks typically used with ink jet printers have a wax based ink vehicle, e.g., a crystalline wax. Such solid ink jet inks provide vivid color images. In typical systems, these crystalline wax inks partially cool on an intermediate transfer member and are then pressed into the image receiving medium such as paper. Transfuse spreads the image droplet, providing a richer color and lower pile height. The low flow of the solid ink also prevents show through on the paper. However, the use of crystalline waxes places limitations for printing, such as the brittleness of these materials which may reduce the ink's robustness properties that are required to provide abrasion-resistant images. Consequently, increased mechanical robustness is desired.

The following documents provide background information:

Hideki Maeta et al., "New Synthetic Method of Organic Pigment Nano Particle by Micro Reactor System," in an abstract available on the internet, describes a new synthetic method of an organic pigment nano particle was realized by micro reactor. A flowing solution of an organic pigment, which dissolved in an alkaline aqueous organic solvent, mixed with a precipitation medium in a micro channel. Two types of micro reactor can be applied efficiently on this build-up procedure without blockage of the channel. The clear dispersion was extremely stable and had narrow size distribution, which were the features, difficult to realize by the conventional pulverizing method (breakdown procedure). These results proved the effectiveness of this process on micro reactor system.

U.S. Patent Application Publication No. 2005/0109240 describes a method of producing a fine particle of an organic pigment, containing the steps of: flowing a solution of an organic pigment dissolved in an alkaline or acidic aqueous medium, through a channel which provides a laminar flow; and changing a pH of the solution in the course of the laminar flow.

WO 2006/132443 A1 describes a method of producing organic pigment fine particles by allowing two or more solutions, at least one of which is an organic pigment solution in which an organic pigment is dissolved, to flow through a microchannel, the organic pigment solution flows through the microchannel in a non-laminar state. Accordingly, the contact area of solutions per unit time can be increased and the length of diffusion mixing can be shortened, and thus instantaneous mixing of solutions becomes possible. As a result, nanometer-scale monodisperse organic pigment fine particles can be produced in a stable manner.

K. Balakrishnan et al., "Effect of Side-Chain Substituents on Self-Assembly of Perylene Diimide Molecules: Morphology Control," J. Am. Chem. Soc., vol. 128, p. 7390-98 (2006) describes the use of covalently-linked aliphatic side-chain substituents that were functionalized onto perylene diimide molecules so as to modulate the self-assembly of molecules and generate distinct nanoparticle morphologies (nano-belts to nano-spheres), which in turn impacted the electronic properties of the material. The side-chain substituents studied were linear dodecyl chain, and a long branched nonyldecyl chain, the latter substituent leading to the more compact, spherical nanoparticle.

WO 2006/011467 discloses a pigment, which is used, for example, in color image display devices and can form a blue pixel capable of providing a high level of bright saturation, particularly a refined pigment, which has bright hue and is excellent in pigment properties such as lightfastness, solvent resistance and heat resistance, and a process for producing the same, a pigment dispersion using the pigment, and an ink for a color filter. The pigment is a subphthalocyanine pigment that is prepared by converting subphthalocyanine of the specified formula, to a pigment, has diffraction peaks at least at diffraction angles (2θ) 7.0°, 12.3°, 20.4° and 23.4° in X-ray diffraction and an average particle diameter of 120 to 20 nm.

U.S. Patent Application Publication No. 2006/0063873 discloses a process for preparing nano water paint comprising the steps of: A. modifying the chemical property on the surface of nano particles by hydroxylation for forming hydroxyl groups at high density on the surface of the nano particles; B. forming self-assembly monolayers of low surface energy compounds on the nano particles by substituting the self-assembly monolayers for the hydroxyl groups on the nano particles for disintegrating the clusters of nano particles and for forming the self-assembly monolayers homogeneously on the surface of the nano particles; and C. blending or mixing the nano particles having self-assembly monolayers formed thereon with organic paint to form nano water paint.

WO 2006/024103 discloses nanopigments prepared from organic IR dye and Na-bentonite with CEC of 95 mmole Na per 100 g of bentonite, at room temperature, by dissolving the Na-bentonite in water and mixing for 2 hours, and mixing in the dye, dissolved in ethanol, for 18 hours. The precipitate is filtered, washed three times with water/ethanol mixture, dried at 105° C. for 10 hours, and milled in a kitchen miller for 2 mins. 0.3 parts of the nanopigments were mixed to 100 parts of pulverized SPG resin and processed in an extruder with a die temperature of 190° C. to form transparent, faintly green or grey colored extrudates which were used to press film of 0.4 mm thickness at 160° C. The films were used to prepare IR-active laminated glass. Near infrared absorption spectra of the glass structures were obtained in a Perkin-Elmer Spectrophotometer.

WO 2006/005521 discloses a photoprotective composition comprising, in a physiologically acceptable medium: a) at least one aqueous phase, b) at least hydrophilic metal oxide nanoparticles, c) at least one vinylpyrrolidone homopolymer. The reference also discloses the use of at least one vinylpyrrolidone homopolymer in a photoprotective composition comprising at least one aqueous phase and at least hydrophilic metal oxide nanoparticles for the purpose of reducing the whitening and/or of improving the stability of the said composition. (dispersibility of the nanoparticles in the aqueous phase).

WO 2006/005536 discloses a method for producing nanoparticles, in particular, pigment particles. Said method consists of the following steps: (i) a raw substance is passed into the gas phase, (ii) particles are produced by cooling or reacting the gaseous raw substance and (iii) an electrical charge is applied to the particles during the production of the particles in step (ii), in a device for producing nanoparticles. The disclosure further relates to a device for producing nanoparticles, comprising a supply line, which is used to transport the gas flow into the device, a particle producing and charging area in order to produce and charge nanoparticles at essentially the same time, and an evacuation line which is used to transport the charged nanoparticles from the particle producing and charging area.

Japanese Patent Application Publication No. JP 2005238342 A2 discloses irradiating ultrashort pulsed laser to organic bulk crystals dispersed in poor solvents to induce ablation by nonlinear absorption for crushing the crystals and recovering the resulting dispersions of scattered particles. The particles with average size approximately 10 nm are obtained without dispersants or grinding agents for contamination prevention and are suitable for pigments, pharmaceuticals, etc.

U.S. Patent Application Publication No. 2003/0199608 discloses a functional material comprising fine coloring particles having an average primary particle diameter of 1 to 50 nm in a dried state, and having a BET specific surface area value of 30 to 500 m.sup.2/g and a light transmittance of not less than 80%. The functional material composed of fine coloring particles, exhibits not only an excellent transparency but also a high tinting strength and a clear hue.

U.S. Pat. No. 6,837,918 discloses a process and apparatus that collects pigment nanoparticles by forming a vapor of a pigment that is solid at room temperature, the vapor of the pigment being provided in an inert gaseous carrying medium. At least some of the pigment is solidified within the gaseous stream. The gaseous stream and pigment material is moved in a gaseous carrying environment into or through a dry mechanical pumping system. While the particles are within the dry mechanical pumping system or after the nanoparticles have moved through the dry pumping system, the pigment material and nanoparticles are contacted with an inert liquid collecting medium.

U.S. Pat. No. 6,537,364 discloses a process for the fine division of pigments which comprises dissolving coarsely crystalline crude pigments in a solvent and precipitating them with a liquid precipitation medium by spraying the pigment solution and the precipitation medium through nozzles to a point of conjoint collision in a reactor chamber enclosed by a housing in a microjet reactor, a gas or an evaporating liquid being passed into the reactor chamber through an opening in the housing for the purpose of maintaining a gas atmosphere in the reactor chamber, and the resulting pigment suspension and the gas or the evaporated liquid being removed from the reactor through a further opening in the housing by means of overpressure on the gas entry side or underpressure on the product and gas exit side.

U.S. Pat. No. 5,679,138 discloses a process for making ink jet inks, comprising the steps of: (A) providing an organic pigment dispersion containing a pigment, a carrier for the pigment and a dispersant; (B) mixing the pigment dispersion with rigid milling media having an average particle size less than 100 μm; (C) introducing the mixture of step (B) into a high speed mill; (D) milling the mixture from step (C) until a pigment particle size distribution is obtained wherein 90% by weight of the pigment particles have a size less than 100 nanometers (nm); (E) separating the milling media from the mixture milled in step (D); and (F) diluting the mixture from step (E) to obtain an ink jet ink having a pigment concentration suitable for ink jet printers.

Japanese Patent Application Publications Nos. JP 2007023168 and JP 2007023169 discloses providing a pigment dispersion compound excellent in dispersibility and flowability used for the color filter which has high contrast and weatherability. The solution of the organic material, for example, the organic pigment, dissolved in a good solvent under the existence of alkali soluble binder (A) which has an acidic group, and a poor solvent which makes the phase change to the solvent are mixed. The pigment nanoparticles dispersed compound re-decentralized in the organic solvent containing the alkali soluble binder (B) which concentrates the organic pigment nanoparticles which formed the organic pigment as the particles of particle size less than 1 μm, and further has the acidic group.

Kazuyuki Hayashi et al., "Uniformed nano-downsizing of organic pigments through core-shell structuring," Journal of Materials Chemistry, 17(6), 527-530 (2007) discloses that mechanical dry milling of organic pigments in the presence of mono-dispersed silica nanoparticles gave core-shell hybrid pigments with uniform size and shape reflecting those of the inorganic particles, in striking contrast to conventional milling as a breakdown process, which results in limited size reduction and wide size distribution.

U.S. Patent Application Publication No. 2007/0012221 describes a method of producing an organic pigment dispersion liquid, which has the steps of: providing an alkaline or acidic solution with an organic pigment dissolved therein and an aqueous medium, wherein a polymerizable compound is contained in at least one of the organic pigment solution and the aqueous medium; mixing the organic pigment solution and the aqueous medium; and thereby forming the pigment as fine particles; then polymerizing the polymerizable compound to form a polymer immobile from the pigment fine particles.

The appropriate components and process aspects of each of the foregoing may be selected for the present disclosure in embodiments thereof, and the entire disclosure of the above-mentioned references are totally incorporated herein by reference.

SUMMARY

The present disclosure addresses these and other needs, by providing nanoscale pigment particle compositions, and methods for producing such nanoscale pigment particle compositions.

In an embodiment, the present disclosure provides a nanoscale pigment particle composition, comprising:
an organic monoazo laked pigment including at least one functional moiety, and
a sterically bulky stabilizer compound including at least one functional group,
wherein the functional moiety associates non-covalently with the functional group; and
the presence of the associated stabilizer limits the extent of particle growth and aggregation, to afford nanoscale-sized pigment particles.

In another embodiment, the present disclosure provides a process for preparing nanoscale-sized monoazo laked pigment particles, comprising:
preparing a first reaction mixture comprising: (a) a diazonium salt including at least one functional moiety as a first precursor to the laked pigment and (b) a liquid medium containing diazotizing agents; and
preparing a second reaction mixture comprising: (a) a coupling agent including at least one functional moiety as a second precursor to the laked pigment and (b) a sterically bulky stabilizer compound having one or more functional groups that associate non-covalently with the coupling agent; and (c) a liquid medium
combining the first reaction mixture into the second reaction mixture to form a third solution and
effecting a direct coupling reaction which forms a monoazo laked pigment composition wherein the functional moiety associates non-covalently with the functional group and having nanoscale particle size.

In still another embodiment, the disclosure provides ink compositions, such as an aqueous or non-aqueous ink composition, an ink jet ink composition, a solid phase change ink composition, a radiation-curable ink composition, or the like, generally comprising at least a carrier and the above nanoscale pigment particle composition.

DETAILED DESCRIPTION OF EXEMPLARY EMBODIMENTS

Figure 1:
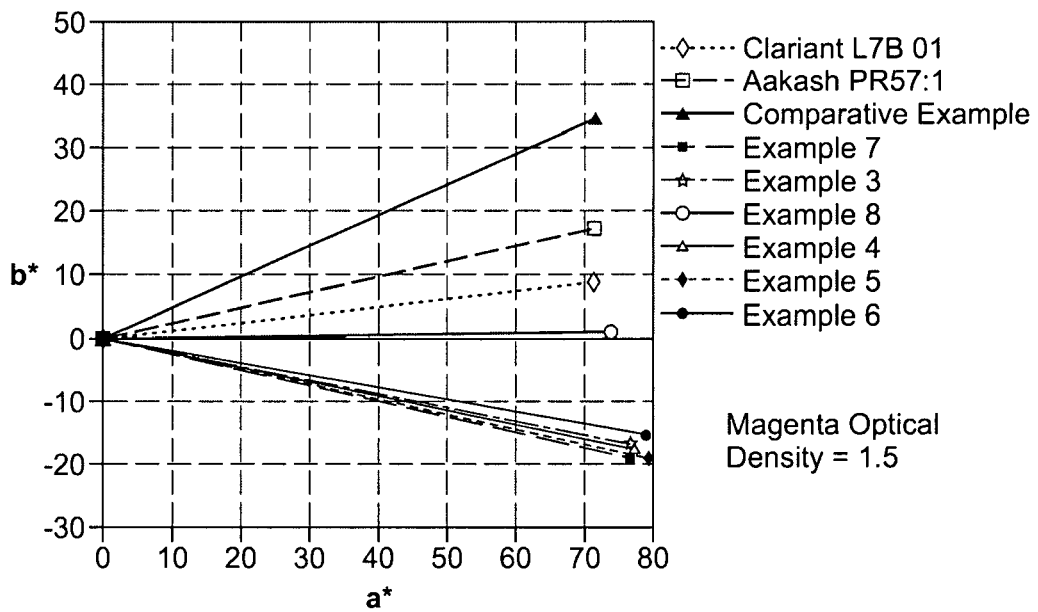
FIG. 1 shows a two-dimensional b* a* Gamut for pigmented coatings according to embodiments.

Embodiments of the present disclosure provide nanoscale pigment particle compositions, and methods for producing such nanoscale pigment particle compositions. The nanoscale pigment particle compositions generally comprise an organic monoazo laked pigment including at least one functional moiety that associates non-covalently with a functional group from a sterically bulky stabilizer compound. The presence of the associated stabilizer limits the extent of particle growth and aggregation, to afford nanoscale particles.

Organic monoazo "laked" pigments are the insoluble metal salt colorants of monoazo colorants which can include monoazo dyes or pigments, and in certain geographic regions these pigments have been referred to as either "toners" or "lakes". The process of ion complexation with a metal salt, or "laking" process, provides decreased solubility of the non-laked non-ionic monoazo pigment, which can enhance the migration resistance and thermal stability properties of a monoazo pigment, and thereby enable the applications of such pigments for extreme performance, such as colorizing plastics and heat-stable paints for outdoor use. The monoazo laked pigments are structurally comprised of a diazo component (DC) and a coupling component (CC) that are linked together with a single azo (N=N) functional group as in the figure below, wherein either or both of the DC and CC contain one or more ionic functional moieties, such as sulfonate or carboxylate anions or the like, and the structure of the ionic pigment also comprises a counteraction, which is typically a metal counteraction, $(M^{n+})$.

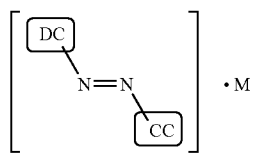

As an example, the organic pigment PR 57:1 ("PR" refers to Pigment Red) has two functional moieties of two different types, a sulfonate anion group $(SO_3^- M^{n+})$ and carboxylate anion group $(CO_2^- M^{n+})$, wherein $M^{n+}$ represents a counter-cation typically chosen from Group 2 alkaline earth metals such as $Ca^{2+}$, but other monoazo laked pigment compositions exist that can have a metal counteraction from either Group 2, Group 3, Group 1, the d-block transition metal cations, and others. Further, the azo group in the compounds can generally assume two different tautomer forms, such as the "azo" form which has the (N=N) linkage, and the "hydrazone" form which has the (C=N—NH—) linkage that is stabilized by an intramolecular hydrogen bond, where the hydrazone tautomer is known to be the preferred structural form for PR 57:1.

surface tension of the pigment particle and neutralize attractive forces between two or more pigment particles or structures, thereby stabilizing the chemical and physical structure of the pigment.

The "average" particle size, which is typically represented as $d_{50}$, is defined as the median particle size value at the 50th percentile of the particle size distribution, wherein 50% of the particles in the distribution are greater than the $d_{50}$ particle size value and the other 50% of the particles in the distribution are less than the $d_{50}$ value. Average particle size can be measured by methods that use light scattering technology to infer particle size, such as Dynamic Light Scattering. The term "particle diameter" as used herein refers to the length of the pigment particle as derived from images of the particles generated by Transmission Electron Microscopy (TEM). The term "nanosized", "nanoscale", or "nanosized pigment particles" refers to for instance, an average particle size, $d_{50}$, or an average particle diameter of less than about 150 nm, such as of about 1 nm to about 100 nm, or about 10 nm to about 80 nm.

The term "complementary" as used in complementary functional moiety of the stabilizer indicates that the complementary functional moiety is capable of noncovalent chemical bonding with the functional moiety of the organic pigment and/or the functional moiety of the pigment precursor.

The term "precursor" as used in "precursor to the organic pigment" can be any chemical substance that is an advanced intermediate in the total synthesis of a compound (such as the organic pigment). In embodiments, the organic pigment and the precursor to the organic pigment may or may not have the same functional moiety. In embodiments, the precursor to the organic pigment may or may not be a colored compound. In still other embodiments, the precursor and the organic pigment can have different functional moieties. In embodiments, where the organic pigment and the precursor have a structural feature or characteristic in common, the phrase "organic pigment/pigment precursor" is used for convenience rather than repeating the same discussion for each of the organic pigment and the pigment precursor.

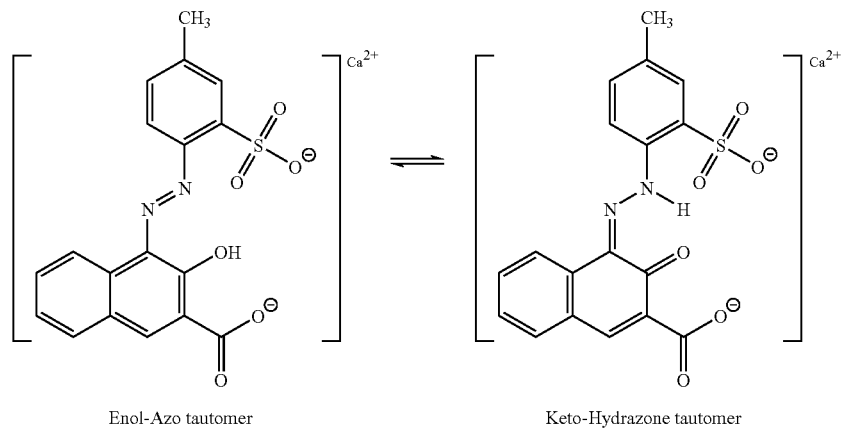

Enol-Azo tautomer          Keto-Hydrazone tautomer

Due to the structural nature of monoazo laked pigments being ionic salts, it is possible to have compounds that associate non-covalently with the pigment, such as organic or inorganic ionic compounds that can associate with the metal cation through ionic or coordination-type bonding. Such ionic compounds are included in a group of compounds which herein are referred to as "stabilizers", and that function to reduce the The functional moiety of the organic pigment/precursor can be any suitable moiety capable of non-covalent bonding with the complementary functional moiety of the stabilizer. Illustrative functional moieties of the organic pigment/precursor include (but are not limited to) the following: sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary or secondary amides, primary or secondary amines, hydroxyl, ketone, aldehyde, oxime, hydroxylamino, enamines (or Schiff base), porphyrins, (phthalo)cyanines, urethane or carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, indenones, and the like.

Pigment precursors for making monoazo laked nanopigments consist of the aniline precursor, which leads to the diazonium component (denoted "DC"), a nucleophilic basic coupling component (denoted "CC"), and a metal cation salt (denoted "M"). Representative examples of the aniline precursor (DC) of laked monoazo pigments that have the functional moiety capable of non-covalent bonding with a complementary functional group on the stabilizer, include (but are not limited to) the following structures in Table 1 (with the functional moiety "FM" encircled, if applicable):

Table 1: Examples of types of aniline precursors (diazo component, DC) that are used to make monoazo laked pigments.

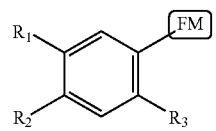

| DC label | FM | $R_1$ | $R_2$ | $R_3$ |
|---|---|---|---|---|
| DC1 | $SO_3H$ | $CH_3$ | H | $NH_2$ |
| DC2 | $SO_3H$ | $CH_3$ | Cl | $NH_2$ |
| DC3 | $SO_3H$ | Cl | $CH_3$ | $NH_2$ |
| DC4 | $SO_3H$ | Cl | $CO_2H$ | $NH_2$ |
| DC5 | $SO_3H$ | Cl | $CH_2CH_3$ | $NH_2$ |
| DC6 | $SO_3H$ | Cl | Cl | $NH_2$ |
| DC7 | $SO_3H$ | H | $NH_2$ | H |
| DC8 | $SO_3H$ | H | $NH_2$ | $CH_3$ |
| DC9 | $SO_3H$ | $NH_2$ | H | Cl |
| DC10 | $SO_3H$ | H | H | $NH_2$ |
| DC11 | $SO_3H$ | H | $NH_2$ | H |
| DC12 | $SO_3H$ | $NO_2$ | $NH_2$ | H |
| DC13 | 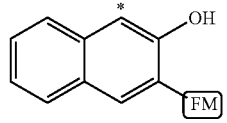 | $NH_2$ | $CH_3$ | H |
| DC14 | $CO_2H$ | H | H | $NH_2$ |
| DC15 | Cl | H | H | $NH_2$ |
| DC16 | $NH_2$ | $CH_3$ | H | H |
| DC17 | $NH_2$ | H | $CH_3$ | H |
| DC18 | —C(O)—$NH_2$ | $NH_2$ | $CH_3$ | H |
| DC19 | —C(O)—$NH_2$ | H | $NH_2$ | H |
| DC20 | $NH_2$ | H | H | H |

Representative examples of the nucleophilic coupling component precursor of laked monoazo pigments that have the functional moiety capable of non-covalent bonding with a complementary functional group on the stabilizer, include (but are not limited to) the following structures in Tables 2-6 (with the functional moiety "FM" encircled, if applicable):

Table 2: Examples of types of coupling component precursors (CC) based on β-naphthol and derivatives, that are used to make monoazo laked pigments.

| DC label | FM | $R_1$ | $R_2$ | $R_3$ |
|---|---|---|---|---|
| DC21 | (structure: 1-sulfo-2-amino naphthalene) | | | "Tobias Acid" |

* = point of coupling to diazo component (β-naphthol structure with FM at 3-position)

| CC label | Class of Coupling Component (CC) | FM |
|---|---|---|
| CC1 | β-Naphthol | H |
| CC2 | β-oxynaphthoic acid ("BONA") | $CO_2H$ |
| CC3 | Naphthol AS derivatives | 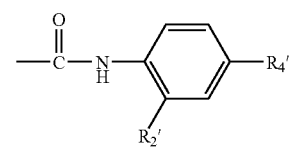 |
| CC6 | Benzimidazolone | 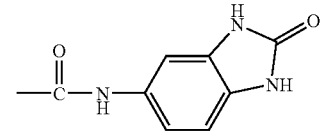 |

Table 3: Examples of types of coupling component precursors (CC) based on naphthalene sulfonic acid derivatives, that are used to make monoazo laked pigments.

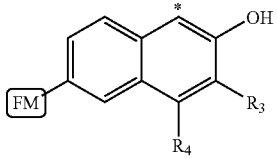

\* = point of coupling to diazo component

| CC label | Class of Coupling Component (CC) | FM | $R_3$ | $R_4$ |
|---|---|---|---|---|
| CC4a | Naphthalene Sulfonic Acid derivatives | $SO_3H$ | H | H |
| CC4b | Naphthalene Sulfonic Acid derivatives | $SO_3H$ | $SO_3H$ | H |

Table 4: Examples of types of coupling component precursors (CC) based on naphthalene sulfonic acid derivatives, that are used to make monoazo laked pigments.

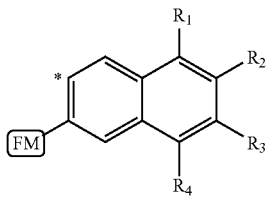

\* = point of coupling to diazo component

| CC label | Class of Coupling Component (CC) | FM | $R_1$ | $R_2$ | $R_3$ | $R_4$ |
|---|---|---|---|---|---|---|
| CC5 | Naphthalene Sulfonic Acid derivatives | $SO_3H$ | 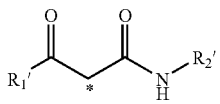 | H | H | $SO_3H$ |

Table 5: Examples of types of coupling component precursors (CC) based on pyrazolone derivatives, that are used to make laked pigments.

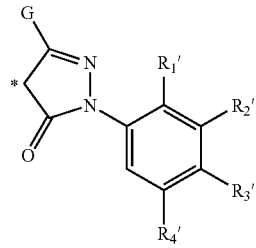

\* = point of coupling to diazo component

| CC label | Class of Coupling Component (CC) | G | $R_{1'}$ | $R_{2'}$ | $R_{3'}$ | $R_{4'}$ |
|---|---|---|---|---|---|---|
| CC7 | Pyrazolone deriv. | $CO_2H$ | H | H | $SO_3H$ | H |
| CC8 | Pyrazolone deriv. | $CH_3$ | H | H | $SO_3H$ | H |
| CC9 | Pyrazolone deriv. | $CH_3$ | H | $SO_3H$ | H | H |
| CC10 | Pyrazolone deriv. | $CH_3$ | Cl | H | $SO_3H$ | Cl |

Table 6: Examples of types of coupling component precursors (CC) based on acetoacetic arylide derivatives, that are used to make laked pigments.

\* = point of coupling to diazo component

| CC label | Class of Coupling Component (CC) | $R_{1'}$ | $R_{2'}$ | $R_a$ | $R_b$ | $R_c$ |
|---|---|---|---|---|---|---|
| CC11 | Acetoacetic arylide | $CH_3$ | 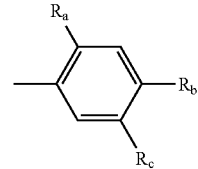 | $R_a$ | H | H | H |

-continued

* = point of coupling to diazo component

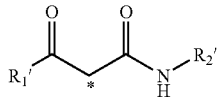

| CC label | Class of Coupling Component (CC) | $R_1'$ | $R_2'$ | $R_a$ | $R_b$ | $R_c$ |
|---|---|---|---|---|---|---|
| CC12 | Acetoacetic arylide | $CH_3$ | (aryl with $R_a$, $R_b$, $R_c$) | $CH_3$ | H | H |
| CC13 | Acetoacetic arylide | $CH_3$ | (aryl with $R_a$, $R_b$, $R_c$) | Cl | H | H |
| CC14 | Acetoacetic arylide | $CH_3$ | (aryl with $R_a$, $R_b$, $R_c$) | H | $OCH_3$ | H |
| CC15 | Acetoacetic benzimidazolone | $CH_3$ | (benzimidazolone) | — | — | — |

The organic pigment, and in some embodiments, the organic pigment precursor, also generally includes a counterion as part of the overall structure. Such counterions can be, for example, any suitable counterion including those that are well known in the art. Such counterions can be, for example, cations or anions of either metals or non-metals that include N, P, S and the like, or carbon-based cations or anions. Examples of suitable cations include ions of Ba, Ca, Cu, Mg, Sr, Li, Na, K, Cs, Mn, Cu, Cr, Fe, Ti, Ni, Co, Zn, V, B, Al, Ga, and the like.

Representative examples of monoazo laked pigments comprised from a selection of diazo component (DC) and coupling component (CC) and metal cation salt (M) are listed in Table 7, and other laked pigment structures may arise from other combinations of DC and CC and metal cation salt (M) that are not shown in Table 7.

Table 7: Examples of monoazo laked pigments.

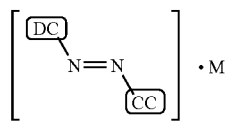

| Color Index # (C.I.) | Color Index (C.I.) Name | Laked Pigment Class | DC precursor | CC precursor | Metal Salt M |
|---|---|---|---|---|---|
| 15500:1 | Red 50:1 | β-Naphthol Lakes | DC14 | CC1 | ½ Ba |
| 15510:1 | Orange 17 | β-Naphthol Lakes | DC7 | CC1 | Ba |
| 15510:2 | Orange 17:1 | β-Naphthol Lakes | DC7 | CC1 | ⅔ Al |
| 15525 | Red 68 | β-Naphthol Lakes | DC4 | CC1 | 2 Ca |
| 15580 | Red 51 | β-Naphthol Lakes | DC8 | CC1 | Ba |

-continued

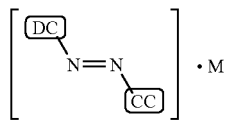

| Color Index # (C.I.) | Color Index (C.I.) Name | Laked Pigment Class | DC precursor | CC precursor | Metal Salt M |
|---|---|---|---|---|---|
| 15585 | Red 53 | β-Naphthol Lakes | DC3 | CC1 | 2 Na |
| 15585:1 | Red 53:1 | β-Naphthol Lakes | DC3 | CC1 | Ba |
| 15585:3 | Red 53:3 | β-Naphthol Lakes | DC3 | CC1 | Sr |
| 15602 | Orange 46 | β-Naphthol Lakes | DC5 | CC1 | Ba |
| 15630 | Red 49 | β-Naphthol Lakes | DC21 | CC1 | 2 Na |
| 15630:1 | Red 49:1 | β-Naphthol Lakes | DC21 | CC1 | Ba |
| 15630:2 | Red 49:2 | β-Naphthol Lakes | DC21 | CC1 | Ca |
| 15630:3 | Red 49:3 | β-Naphthol Lakes | DC21 | CC1 | Sr |
| 15800 | Red 64 | β-oxynaphthoic acid (BONA) Lakes | DC20 | CC2 | ½ Ba |
| 15800:1 | Red 64:1 | β-oxynaphthoic acid (BONA) Lakes | DC20 | CC2 | ½ Ca |
| 15800:2 | Brown 5 | β-oxynaphthoic acid (BONA) Lakes | DC20 | CC2 | ½ Cu |
| 15825:2 | Red 58:2 | β-oxynaphthoic acid (BONA) Lakes | DC9 | CC2 | Ca |
| 15825:4 | Red 58:4 | β-oxynaphthoic acid (BONA) Lakes | DC9 | CC2 | Mn |
| 15850:1 | Red 57:1 | β-oxynaphthoic acid (BONA) Lakes | DC1 | CC2 | Ca |
| 15860:1 | Red 52:1 | β-oxynaphthoic acid (BONA) Lakes | DC3 | CC2 | Ca |
| 15860:2 | Red 52:2 | β-oxynaphthoic acid (BONA) Lakes | DC3 | CC2 | Mn |
| 15865:1 | Red 48:1 | β-oxynaphthoic acid (BONA) Lakes | DC2 | CC2 | Ba |
| 15865:2 | Red 48:2 | β-oxynaphthoic acid (BONA) Lakes | DC2 | CC2 | Ca |
| 15865:3 | Red 48:3 | β-oxynaphthoic acid (BONA) Lakes | DC2 | CC2 | Sr |
| 15865:4 | Red 48:4 | β-oxynaphthoic acid (BONA) Lakes | DC2 | CC2 | Mn |
| 15865:5 | Red 48:5 | β-oxynaphthoic acid (BONA) Lakes | DC2 | CC2 | Mg |
| 15867 | Red 200 | β-oxynaphthoic acid (BONA) Lakes | DC5 | CC2 | Ca |
| 15880:1 | Red 63:1 | β-oxynaphthoic acid (BONA) Lakes | DC21 | CC2 | Ca |
| 15880:2 | Red 63:2 | β-oxynaphthoic acid (BONA) Lakes | DC21 | CC2 | Mn |
| 15892 | Red 151 | Naphthol AS Lakes | DC10 | CC3 ($R_2'$ = H, $R_4'$ = $SO_3H$) | Ba |
| 15910 | Red 243 | Naphthol AS Lakes | DC2 | CC3 ($R_2'$ = $OCH_3$, $R_4'$ = H) | ½ Ba |
| 15915 | Red 247 | Naphthol AS Lakes | DC13 | CC3 ($R_2'$ = H, $R_4'$ = $OCH_3$) | Ca |
| 15985:1 | Yellow 104 | Naphthalene Sulfonic Acid Lakes | DC7 | CC4a | ⅔ Al |
| 15990 | Orange 19 | Naphthalene Sulfonic Acid Lakes | DC15 | CC4a | ½ Ba |
| 16105 | Red 60 | Naphthalene Sulfonic Acid Lakes | DC14 | CC4b | ½ Ba |
| 18000:1 | Red 66 | Naphthalene Sulfonic Acid Lakes | DC16 | CC5 | ½ Ba, Na |

The complementary functional group of the stabilizer can be one or more of any suitable moiety capable of non-covalent bonding with the functional moiety of the stabilizer. Illustrative complementary functional groups on the stabilizer include the following: sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary or secondary amides, primary or secondary amines, hydroxyl, ketone, aldehyde, oxime, hydroxylamino, enamines (or Schiff base), porphyrins, (phthalo)cyanines, urethane or carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, indenones, and the like.

The stabilizer can be any compound that has the function of limiting the extent of pigment particle self-assembly to produce nanoscale-sized pigment particles. The stabilizer compound should have a hydrocarbon moiety that provides sufficient steric bulk to enable the function of the stabilizer to regulate pigment particle size. The hydrocarbon moiety in embodiments is predominantly aliphatic, but in other embodiments can also incorporate aromatic groups, and generally contains at least 6 carbon atoms, such as at least 12 carbons or at least 16 carbons, and not more than about 100 carbons, but the actual number of carbons can be outside of these ranges. The hydrocarbon moiety can be either linear, cyclic or branched, and in embodiments is desirably branched, and may or may not contain cyclic moieties such as cycloalkyl rings or aromatic rings. The aliphatic branches are long with at least 2 carbons in each branch, such as at least 6 carbons in each branch, and not more than about 100 carbons.

It is understood that the term "steric bulk" is a relative term, based on comparison with the size of the pigment or pigment precursor to which it becomes non-covalently associated. In embodiments, the phrase "steric bulk" refers to the situation when the hydrocarbon moiety of the stabilizer compound that is coordinated to the pigment/precursor surface, occupies a 3-dimensional special volume that effectively prevents the approach or association of other chemical entities (e.g. colorant molecules, primary pigment particles or small pigment aggregate) toward the pigment/precursor surface. Thus, the stabilizer should have its hydrocarbon moiety large enough so that as several stabilizer molecules become non-covalently associated with the chemical entity (pigment or precursor), the stabilizer molecules act as surface barrier agents for the primary pigment particles and effectively encapsulates them, and thereby limits the growth of the pigment particles and affording only nanoparticles of the pigment. For example, for the pigment precursor Lithol Rubine and for the organic pigment. Pigment Red 57:1, the following illustrative groups on a stabilizer are considered to have adequate "steric bulk" so as to enable the stabilizer to limit the extent of pigment self-assembly or aggregation and mainly produce pigment nano-sized particles:

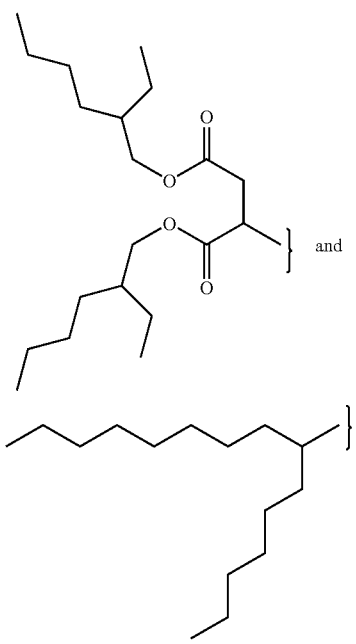

Representative examples of stabilizer compounds that have both the functional group that non-covalently associates with the pigment and the sterically bulky hydrocarbon moiety, include (but are not limited to) the following compounds:

C36 Dimer Diacid

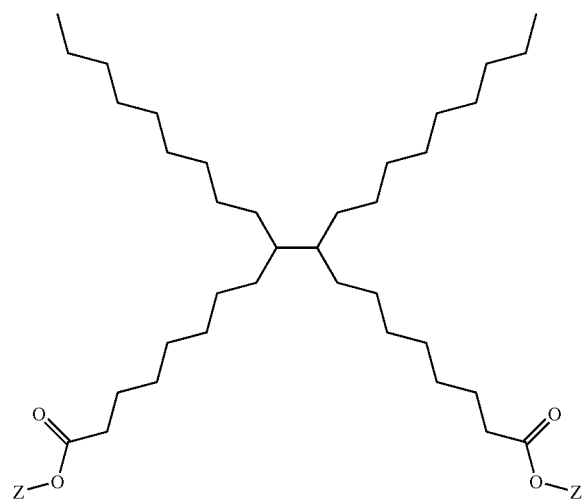

-continued

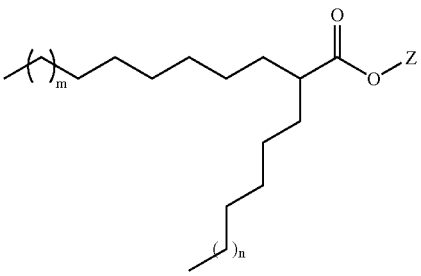

Z = H; Metal cations such as Na, K, Li, Ca, Ba, Sr, Mg, Mn, Al, Cu, B, and others; Organic cations such as $NH_4^+$, $NR_4^+$, $PR_4^+$, and others Z = H; Metal cations such as Na, K, Li, Ca, Ba, Sr, Mg, Mn, Al, Cu, B, and other; Organic cations such as $NH_4^+$, $NR_4^+$, $PR_4^+$, and others
and methylene units $(m + n) > 1$

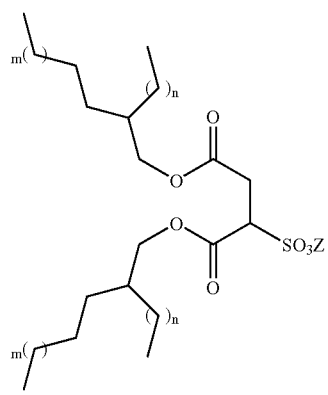

Z = H; Metal cations such as Na, K, Li, Ca, Ba, Sr, Mg, Mn, Al, Cu, B, and other; Organic cations such as $NH_4^+$, $NR_4^+$, $PR_4^+$, and others
and methylene units $(m + n) > 1$ per branch

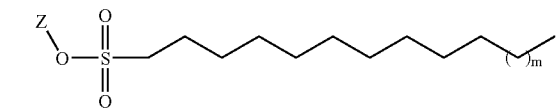

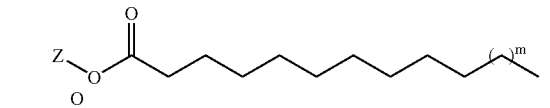

Z = H; Metal cations such as Na, K, Li, Ca, Ba, Sr, Mg, Mn, Al, Cu, B, and other; Organic cations such as $NH_4^+$, $NR_4^+$, $PR_4^+$, and others
and methylene units $m \geq 1$
and for iso-stearic acid, $n \leq 1$ In additional embodiments, other stabilizer compounds having different structures that those described previously may be used in addition to sterically bulky stabilizer compounds, to function as surface active agents (or surfactants) that either prevent or limit the degree of pigment particle aggregation. Representative examples of such surface active agents include, but are not limited to, derivatives of rosin natural products, acrylic-based polymers, styrene-based copolymers, copolymers of α-olefins such as 1-hexadecene, 1-octadecene, 1-eicosene, 1-triacontene and the like, copolymers of vinyl pyridine, vinyl imidazole, and vinyl pyrrolidinone, polyester copolymers, polyamide copolymers, copolymers of acetals and acetates such as the copolymer poly(vinylbutyral)-co-(vinyl alcohol)-co-(vinyl acetate).

The types of non-covalent chemical bonding that can occur between the functional moiety of the precursor/pigment and the complementary functional group of the stabilizer are, for example, van der Waals' forces, ionic or coordination bonding, hydrogen bonding, and/or aromatic pi-stacking bonding. In embodiments, the non-covalent bonding is predominately ionic bonding, but can include hydrogen bonding and aromatic pi-stacking bonding as additional or alternative types of non-covalent bonding between the functional moieties of the stabilizer compounds and the precursor/pigment.

The method of making nano-sized particles of the monoazo laked pigments such as those listed in Table 7 is a process that involves at least one or more reaction steps. A diazotization reaction is a key reaction step for synthesis of the monoazo laked pigment, whereby a suitable aniline precursor (or diazo component DC, such as those listed in Table 1), is either directly or indirectly converted first to a diazonium salt using standard procedures, such as procedures that include treatment with a diazotizing agent such as nitrous acid $HNO_2$ (for example, generated in situ by mixing sodium nitrite with dilute hydrochloric acid solution) or nitrosyl sulfuric acid (NSA), which is commercially available or prepared by mixing sodium nitrite in concentrated sulfuric acid. The resulting acidic mixture of diazonium salt is either a solution or a suspension and in embodiments is kept cold, to which can optionally be added an aqueous solution of the metal salt ($M^{n+}$) that will define the specific composition of the desired monoazo laked pigment product, such as those listed in Table 7. The diazonium salt solution or suspension is then transferred into a solution or suspension of a suitable coupling component (CC, such as those listed in Tables 2-6) that can be either acidic or basic in pH and generally contain additional buffers and surface active agents, including the sterically bulky stabilizer compounds such as those described earlier, to produce a solid colorant material suspended as an aqueous slurry.

The solid colorant material may be the desired monoazo laked pigment product, or it may be an advanced synthetic intermediate for making the monoazo laked pigment product. In the case of the latter, a two-step process is required for preparing the nanosized particles of monoazo laked pigment, whereby the second step involves rendering the advanced synthetic intermediate of the first step above (the pigment precursor) into homogeneous liquid solution by treatment with either strong acid or alkaline base, treating this solution with one or more surface active agents in addition to sterically bulky stabilizer compounds, as described earlier, followed lastly by treatment with the required metal salt solution to provide the required laked pigment composition as a solid precipitate, said metal salt solution effectively functioning as a pigment precipitating agent. Several chemical as well as physical processing factors can affect the final particle size and distribution of the monoazo laked pigment, including stoichiometries of the DC and CC reactants, metal salt, surface active agents, and stabilizer compounds, concentration of chemical species in the liquid medium, pH of liquid medium, temperature, addition rate, order of addition, agitation rate, post-reaction treatments such as heating, isolation and washing of particles, and drying conditions.

In embodiments is disclosed a two-step method of making nanosized monoazo laked red pigments, for example Pigment Red 57:1, wherein the advanced pigment precursor Lithol Rubine is first synthesized as a potassium salt and is a water-soluble orange dye. The first step involves the diazotization of 2-amino-5-methyl-benzenesulfonic acid (DC1 in Table 1) by first dissolving the DC in dilute aqueous potassium hydroxide solution (0.5 mol/L) and cooling to a temperature of about −5° C. to about 10° C., and then treating the solution with an aqueous solution of sodium nitrite (20 wt %), following with slow addition of concentrated hydrochloric acid at a rate that maintains the internal reaction temperature between −5° C. and +5° C. The resulting suspension that forms is stirred for additional time at cool temperature, so as to ensure completeness of diazotization, and then the suspension is carefully transferred to a second solution containing 3-hydroxy-2-naphthoic acid dissolved in dilute alkaline solution (0.5 mol/L potassium hydroxide) using vigorous agitation as the colorant product is produced in the aqueous slurry. After stirring for additional time of at least 1 hour at room temperature, the colorant product (Lithol Rubine-potassium salt) is isolated by filtration as an orange dyestuff and washed with deionized water to remove excess acid and salt by-products.

The second step of this process involves redispersing the orange Lithol Rubine-potassium salt dyestuff in deionized water to a concentration that can range from about 0.5 wt % to about 20 wt %, such as from about 1.5 wt % to about 10 wt % or from about 3.5 wt % to about 8 wt %, but the concentrations can also be outside of these ranges. The colorant solids in the slurry is then dissolved completely into liquid solution by treatment with aqueous alkaline base, such as sodium hydroxide or potassium hydroxide or ammonium hydroxide solution, until the pH level is high, such as above pH 8.0 or above pH 9.0 or above pH 10.0. To this alkaline solution of dissolved Lithol Rubine colorant can be optionally added a surface active agent as described earlier, in particular embodiments surface active agent such as rosin soaps, delivered as an aqueous solution in the amount ranging from 0.1 wt % to 20 wt % based on colorant solids, such as in an amount ranging from 0.5 wt % to about 10 wt %, or in an amount ranging from 1.0 wt % to about 8.0 wt % based on colorant solids, but the amount used can also be outside of these ranges.

In embodiments, the preparation of ultrafine and nanosized particles of the monoazo laked Pigment Red 57:1 was only enabled by the additional use of a stabilizer compound having a functional moiety that could non-covalently bond to the complementary functional moiety of the pigment as well as branched aliphatic functional groups that could provide steric bulk to the pigment particle surface. In embodiments, particularly suitable sterically bulky stabilizer compounds are branched hydrocarbons with either carboxylate or sulfonate functional groups, compounds such as di[2-ethylhexyl]-3-sulfosuccinate sodium or sodium 2-hexyldecanoate, and the like. The stabilizer compound is introduced as a solution or suspension in a liquid that is predominantly aqueous but may optionally contain a polar, water-miscible co-solvent such as THF, iso-propanol, NMP, Dowanol and the like, to aid dissolution of the stabilizer compound, in an amount relative to colorant moles ranging from about 5 mole-percent to about 100 mole-percent, such as from about 20 mole-percent to about 80 mole-percent, or from about 30 mole-percent to about 70 mole-percent, but the concentrations used can also be outside these ranges and in large excess relative to moles of colorant.

Lastly, the metal cation salt is added to transform the pigment precursor (Lithol Rubine-potassium salt in embodiments) into the desired monoazo laked pigment (Pigment Red 57:1 in embodiments) as a precipitated pigment. The aqueous solution of metal salt (calcium chloride in embodiments) with concentration ranging anywhere from 0.1 mol/L to about 2 mol/L, is slowly added dropwise in nearly stoichiometric quantities such as amounts ranging from 1.0 molar equivalents relative to about 2.0 molar equivalents, or from 1.1 to about 1.5 molar equivalents, or from 1.2 to about 1.4 molar equivalents relative to moles of colorant, however the amounts used can also be outside of these ranges and in large excess.

The type of metal salt can have an impact on the degree of formation of nanosized pigment particles of monoazo laked pigments, in particular the type of ligand that is coordinated to the metal cation in the raw material and the relative ease with which it is displaced by a competing ligand from either the pigment functional moiety or the complementary functional moiety of the stabilizer compound, or both. In embodiments for monoazo laked Pigment Red 57:1, the nanosized particles are formed using calcium (II) salts with ligands such as chloride, sulfate, acetate, and hydroxide; however a particularly desirable metal salt is calcium chloride for fastest reactivity.

The rates of addition of metal salt solution can also vary. For example, the slower the rate of addition, the more controlled is the rate of pigment crystal formation and particle aggregation, and therefore the smaller the pigment particles become.

Also important is the agitation rate and mixing pattern as the pigment formation/precipitation step is occurring. The higher the agitation rate and the more dynamic or complex is the mixing pattern (i.e. with baffles to prevent dead mixing zones), the smaller is the average particle diameter and the more narrow is the particle size distribution, as observable by Transmission Electron Microscopy (TEM) imaging.

Temperature during the pigment precipitation step using the metal salt solution is also important. In embodiments, lower temperatures are desired, such as from about 10° C. to about 50° C., or from about 15° C. to about 35° C., but the temperature can also be outside of these ranges.

In embodiments, the slurry of pigment nanoparticles is not treated nor processed any further, such as additional heating, but instead is isolated by vacuum filtration through membrane filter cloth having average pore size of 0.45 micron or 0.8 micron diameter. The pigment solids can be washed copiously with deionized water to remove excess salts or additives that were not being non-covalently bound to the pigment particles, as intended by the stabilizer compounds. The pigment solids are subsequently dried by freeze-drying under high vacuum to afford high quality, non-agglomerated pigment particles that when imaged by TEM, exhibited primary pigment particles and small aggregates ranging in diameters from about 30 nm to about 150 nm, and predominantly from about 50 nm to about 125 nm. (Here, it is noted that average particle size $d_{50}$ and particle size distributions are measured by Dynamic Light Scattering, an optical measurement technique that estimates the hydrodynamic radius of non-spherical pigment particles gyrating and translating in a liquid dispersion via Brownian motion, by measuring the intensity of the incident light scattered from the moving particles. As such, the $d_{50}$ particle size metric obtained by DLS technique is always a larger number than the actual particle diameters observed by TEM imaging.)

Characterization of the chemical composition of washed and dried nanosized pigment particles are performed by NMR spectroscopy and elemental analysis. In embodiments, the composition of the monoazo laked pigment Red 57:1 indicated that the nanosized particled prepared by the method described above, using di[2-ethylhexyl]-3-sulfosuccinate sodium as the sterically bulky stabilizer, retained at least 80% of the sterically bulky stabilizer that was loaded into the process of making the nanoparticles, even after copious washing with deionized water to remove excess salts. Solid state $^{1}$H— and $^{13}$C-NMR spectroscopic analyses indicated that the steric stabilizer compound was associated non-covalently with the pigment as a calcium salt, and the chemical structure of the pigment adopted the hydrazone tautomer form, as shown in Figure below.

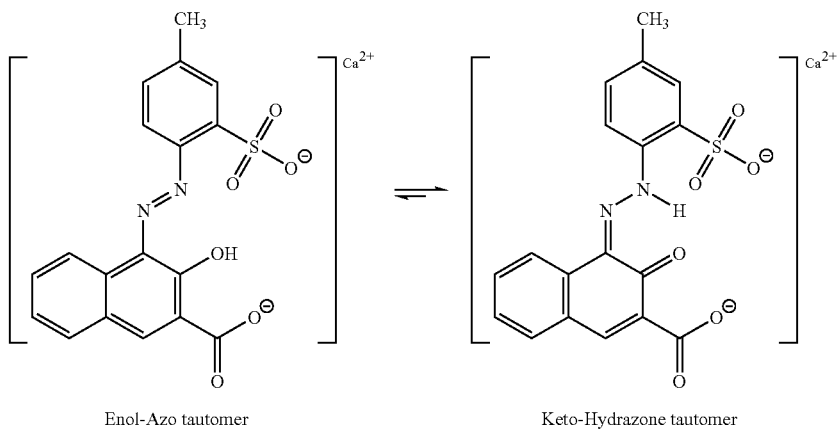

Enol-Azo tautomer   Keto-Hydrazone tautomer

Pigment particles of monoazo laked pigments such as PR 57:1 that have smaller particle sizes could also be prepared by the above two-step method with the use of surface active agents alone depending on the concentrations and process conditions employed, but the pigment product did not predominantly exhibit nano-sized particles nor did the particles exhibit regular morphologies. By comparison, in the absence of using the sterically bulky stabilizer compound, the two-step method described above typically produced rod-like particle aggregates, ranging in average particle diameter from 200-700 nm and with wide particle distribution, and such particles were difficult to disperse into a polymer coating matrix and gave poor coloristic properties. In embodiments, the combined use of a suitable sterically bulky stabilizer compound, such as branched alkanesulfonates or alkylcarboxylates, with a minor amount of suitable surface active agent such as derivatives of rosin-type natural products, by the two-step process would afford the smallest fine pigment particles in the nanometer-scale diameters, more narrow particle size distribution, and low aspect ratio. Various combinations of these compounds, in addition to variations with process parameters such as stoichiometry of reactants, concentration, addition rate, temperature, agitation rate, reaction time, and post-reaction product recovery processes, enables the formation of pigment particles with tunable average particle size ($d_{50}$) from nanoscale sizes (about 1 to about 100 nm) to mesoscale sizes (about 100 to about 500 nm) or larger. The dispersion ability and coloristic properties (L*, a*, b*, chroma, hue angle, light scatter index) of the pigment particles in a thin polymer binder coating were directly correlated to the average pigment particle size, which in turn was impacted by the structural type and amount of sterically bulky stabilizer compound that was employed in the synthesis process.

The advantages of this process include the ability to tune particle size and composition for the intended end use application of the monoazo laked pigment, such as toners and inks and coatings, which include phase-change, gel-based and radiation-curable inks, solid and non-polar liquid inks, solvent-based inks and aqueous inks and ink dispersions. For the end-use application in piezoelectric inkjet printing, nano-sized particles are advantageous to ensure reliable inkjet printing and prevent blockage of jets due to pigment particle agglomeration. In addition, nanosized pigment particles are advantageous for offering enhanced color properties in printed images, since in embodiments the color properties of nanosized particles of monoazo laked pigment Red 57:1 were tunable with particle size, whereby as average particle size was decreased to nanometer-scale, the hue angles were shifted from yellowish-red hues to bluish-red hues by an amount ranging from about 5 to about 35° in the color gamut space.

The method of making nanosized particles of monoazo laked pigments can also be performed by a one-step method, wherein a suitable aniline precursor (or diazo component DC, such as those listed in Table 1), is either directly or indirectly converted first to a diazonium salt using standard procedures, such as that include treatment with a diazotizing agent such as nitrous acid $HNO_2$ (for example, generated in situ by mixing sodium nitrite with dilute hydrochloric acid solution) or nitrosyl sulfuric acid (NSA), which is commercially available or prepared by mixing sodium nitrite in concentrated sulfuric acid. The resulting acidic mixture of diazonium salt is either a solution or a suspension and is preferably kept cold, to which is added an aqueous solution of the metal salt ($M^{n+}$) that will define the specific composition of the desired monoazo laked pigment product, such as those listed in Table 7. The diazonium salt solution or suspension is then transferred into a solution or suspension of a suitable coupling component (CC, such as those listed in Tables 2-6) that can be either acidic or basic in pH and contain additional buffers and surface active agents, including the sterically bulky stabilizer compounds such as those described earlier, to produce a solid colorant material suspended as an aqueous slurry. The solid colorant material produced is the desired monoazo laked pigment product suspended in aqueous slurry, which is isolated by vacuum filtration, washed with copious amounts of deionized water to remove excess salt by-products, and preferably freeze-dried under vacuum, affording fine and nanosized particles of the pigment.

In embodiments, the nanosized pigment particles that were obtained for monoazo laked pigments can range in average particle size, $d_{50}$, or average particle diameter, from about 10 nm to about 250 nm, such as from about 25 nm to about 175 nm, or from about 50 nm to about 150 nm, as measured by either dynamic light scattering method or from TEM images. In embodiments, the particle size distributions can range such that the geometric standard deviation can range from about 1.1 to about 1.9, or from about 1.2 to about 1.7, as measured by dynamic light scattering method. The shape of the nanosized pigment particles can be one or more of several morphologies, including rods, platelets, needles, prisms or nearly spherical, and the aspect ratio of the nanosize pigment particles can range from 1:1 to about 10:1, such as having aspect ratio between 1:1 and 5:1; however the actual metric can lie outside of these ranges.

The color of the nanosized pigment particles have the same general hue as is found with larger pigment particles. However, in embodiments, is disclosed coloristic properties of thin coatings of the nanosized pigment particles of red monoazo laked pigments dispersed in a polymer binder (such as of poly(vinyl butyral-co-vinyl alcohol-co-vinyl acetate)), that exhibited a significant shift to lower hue angle and lower b* values that revealed more bluish magenta hues, and having either no change or a small enhancement of a* value. In embodiments, the hue angles of the coatings dispersed with the nanosized particles of monoazo laked pigment such as Pigment Red 57:1 measured in the range from about 345° to about 50 on the 2-dimensional b* a* color gamut space, as compared with hue angles ranging from about 0° to about 20° for similarly prepared polymer coatings dispersed with larger sized particles of Pigment Red 57:1. In embodiments is disclosed the coloristic properties (hue angle, a*, b*, and NLSI as measure of specular reflectivity) of nanosized pigment particles, particularly of monoazo laked red pigment, that are directly correlated and tunable with the average pigment particle size, measured by either Dynamic Light Scattering or electron microscopy imaging techniques, as well as pigment composition with the non-covalently associated stabilizer, the latter which enables the control of particle size during pigment synthesis, and also enables enhanced dispersability within certain polymer binders for coating or other applications.

Additionally, the specular reflectivity of the coatings of the nanosize monoazo lakes red pigment was significantly enhanced from coatings produced with larger sized pigment particles, which is an indicator of having very small particles being well-dispersed within the coating. Specular reflectivity was quantified as the degree of light scattering for the pigmented coating, a property that is dependent on the size and shape distributions of the pigment particles and their relative dispersability within the coating binder. The Normalized Light Scatter Index (NLSI) was quantified by measuring the spectral absorbance of the coating in a region where there is no absorbance from the chromogen of the monoazo laked pigment, but only absorbance due to light scattered from large aggregates and/or agglomerated pigment particles dispersed in the coating binder. The light scattering absorbance data is then normalized to a lambda-max optical density of 1.5, resulting in the NLSI value, in order to directly compare the light scattering indices of several pigmented coatings. The lower is the NLSI value, the smaller is the pigment particle size within the dispersed coating matrix. In embodiments, the NLSI value of the nanosized monoazo laked red pigments can range from about 0.1 to about 3.0, such as from about 0.1 to about 1.0, as compared to the NLSI values observed with similarly prepared coatings containing larger sized monoazo laked red pigments that range anywhere from about 3.0 to about 75 (a very poorly dispersed coating).

The formed nanoscale pigment particle compositions can be used, for example, as coloring agents in a variety of compositions, such as in liquid (aqueous or non-aqueous) ink vehicles, including inks used in conventional pens, markers, and the like, liquid ink jet ink compositions, solid or phase change ink compositions, and the like. For example, the colored nanoparticles can be formulated into a variety of ink vehicles, including "low energy" solid inks with melt temperatures of about 60 to about 130° C., solvent-based liquid inks or radiation-curable such as UV-curable liquid inks comprised of alkyloxylated monomers, and even aqueous inks. Various types of such compositions will now be described in more detail.

In embodiments, these nanoscale-sized pigments can be dispersed in a variety of media where such high specular reflectance is afforded. Polymeric binders that aid in the dispersion and coating ability of nanoscale-sized pigments include, but are not limited to, derivatives of rosin natural products, acrylic-based polymers, styrene-based copolymers, copolymers of α-olefins such as 1-hexadecene, 1-octadecene, 1-eicosene, 1-triacontene and the like, copolymers of vinyl pyridine, vinyl imidazole, and vinyl pyrrolidinone, polyester copolymers, polyamide copolymers, copolymers of acetals. More specific examples of polymeric binders include, but are not limited to, poly(vinyl butyral-co-vinyl alcohol-co-vinyl acetate), poly(vinyl acetate), poly(acrylic acid), poly(methacrylic acid), poly(vinyl alcohol), poly(methyl methacrylate), polyester, Lexan®, polycarbonate, poly(styrene-b-4-vinylpyridine) and the like. Suitable mixtures of at least two polymers can also be used to generate nanoscale-sized pigments dispersions in liquid media. Suitable carrier solvents used to disperse the nanoscale-sized pigments with various polymers where solubility of the polymers is ensured include, but are not limited to, n-butyl acetate, tetrahydrofuran, n-butanol, methyl ethyl ketone, isopropyl alcohol, toluene, monochlorobenzene, methylene chloride, water and the like. It may be desirable to use suitable mixtures of at least two solvents with one polymeric binder to effect dispersion of the nanoscale-sized pigments. It may also be desirable to use suitable mixtures of at least two solvents with at least two polymeric binders to effect dispersion of the nanoscale-sized pigments.

The nanoscale-sized pigments can be formulated into a number of different coating compositions having various adhesive and coloristic properties on different media, including paperstock, cardstock, and flexible substrates such as Melinex®, Mylar®, Cronar® and the like.

For considerations involving more permanent image robustness, radiation curable inks can be used. The selection of monomers for radiation-curable dispersions, and inks made from them, is based on a number of criteria including the degree of acrylate functionality and reactivity, viscosity, thermal stability, surface tension, relative toxicological level, vapor pressure and other considerations such as relative commercial abundance and cost. It is desirable to have at least one UV monomer that is a diacrylate which has a viscosity less than about 15 cP at room temperature and less than about 3.5 cP at 85 C and which has a surface tension more than about 30 dynes/cm at room temperature and more than about 25 dynes/cm at 85 C, although the values can be outside these ranges. For example, a propoxylated neopentyl glycol diacrylate (SR-9003, available from Sartomer Company) satisfies these viscosity and surface tension requirements for radiation-curable dispersions suitable for preparing a radiation-curable inkjet ink.

In embodiments, the use of dyes as colorants in radiation-curable inks and dispersions containing photoinitiators is limited and generally not desired as these dyes are generally not photo-stable during the curing process and can become severely bleached and washed out resulting in generally poor image quality and low optical contrast of the image. It is more preferable to utilize pigments in radiation-curable dispersions and inks due to their much improved photo-stability over dyes during the curing process.

In other embodiments, it is also preferable to utilize nanoscale-sized pigments in radiation-curable inks and dispersions, an advantage being due to the smaller particles of nanoscale-sized pigments compared with larger-sized conventional pigments, whereby a lesser amount by weight of nanoscale-sized pigment can be formulated within a radiation-curable ink or dispersion compared with using conventional pigments, to afford the same optical density of final cured image.

In some embodiments, the radiation-curable ink composition can include a radiation-curable gellant to act as a phase change agent to gel the UV-curable monomer as it is jetted from the printhead at elevated temperature and onto a substrate such as paper at reduced temperature.

In embodiments, the radiation-curable ink composition can include a radiation-curable wax, such as an acrylate wax, to act as a phase change agent in the radiation-curable vehicle.

In still other embodiments, the radiation-curable ink composition can include at least one radiation-curable gellant and at least one radiation-curable wax.

Ink jet ink compositions according to this disclosure generally include a carrier, a colorant, and one or more additional additives. Such additives can include, for example, solvents, waxes, antioxidants, tackifiers, slip aids, curable components such as curable monomers and/or polymers, gallants, initiators, sensitizers, humectants, biocides, preservatives, and the like. Specific types and amounts of components will depend, of course, on the specific type of ink composition, such as liquid, curable, solid, hot melt, phase change, gel, or the like. The formed nanoscale pigment particle compositions can be used, for example, in such inks as colorants.

Generally, the ink compositions contain one or more colorant. Any desired or effective colorant can be employed in the ink compositions, including pigment, dye, mixtures of pigment and dye, mixtures of pigments, mixtures of dyes, and the like. In embodiments, the colorant used in the ink composition consists entirely of the formed nanoscale-sized pigment compositions. However, in other embodiments, the nanoscale-sized pigment compositions can be used in combination with one or more conventional or other colorant material, where the nanoscale-sized pigment compositions can form substantially most of the colorant material (such as about 90% or about 95% by weight or more), they can form a majority of the colorant material (such as at least 50% by weight or more), or they can form a minority of the colorant material (such as less than about 50% by weight). For the end-use application in piezoelectric inkjet printing, nano-sized pigment particles are advantageous to ensure reliable inkjet printing and prevent blockage of jets due to pigment particle agglomeration. In addition, nanosized pigment particles are advantageous for offering enhanced color properties in printed images, since in embodiments the color properties of nanosized particles of monoazo laked pigment Red 57:1 were tunable with particle size, whereby as average particle size ($d_{50}$) was decreased to nanometer-scale, the hue angles were shifted from yellowish-red hues to bluish-red hues by an amount ranging from about 5 to 35° in the color gamut space. In still other embodiments, the nanoscale-sized pigment compositions can be included in the ink composition in any other varying amount, to provide either colorant and/or other properties to the ink composition.

The colorant, such as nanoscale-sized pigment compositions in embodiments, can be present in the ink composition in any desired or effective amount to obtain the desired color or hue. For example, the colorant can typically be present in an amount of at least about 0.1 percent by weight of the ink, such as at least about 0.2 percent by weight of the ink or at least about 0.5 percent by weight of the ink, and typically no more than about 50 percent by weight of the ink, such as no more than about 20 percent by weight of the ink or no more than about 10 percent by weight of the ink, although the amount can be outside of these ranges.

The ink compositions can also optionally contain an antioxidant. The optional antioxidants of the ink compositions protect the images from oxidation and also protect the ink components from oxidation during the heating portion of the ink preparation process. Specific examples of suitable antioxidants include NAUGUARD® series of antioxidants, such as NAUGUARD® 445, NAUGUARD® 524, NAUGUARD® 76, and NAUGUARD® 512 (commercially available from Uniroyal Chemical Company, Oxford, Conn.), the IRGANOX® series of antioxidants such as IRGANOX® 1010 (commercially available from Ciba Geigy), and the like. When present, the optional antioxidant can be present in the ink in any desired or effective amount, such as in an amount of from at least about 0.01 to about 20 percent by weight of the ink, such as about 0.1 to about 5 percent by weight of the ink, or from about 1 to about 3 percent by weight of the ink, although the amount can be outside of these ranges.

The ink compositions can also optionally contain a viscosity modifier. Examples of suitable viscosity modifiers include aliphatic ketones, such as stearone, and the like. When present, the optional viscosity modifier can be present in the ink in any desired or effective amount, such as about 0.1 to about 99 percent by weight of the ink, such as about 1 to about 30 percent by weight of the ink, or about 10 to about 15 percent by weight of the ink, although the amount can be outside of these ranges.

Other optional additives to the inks include clarifiers, such as UNION CAMP® X37-523-235 (commercially available from Union Camp); tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWAKE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like; adhesives, such as VERSAMID® 757, 759, or 744 (commercially available from Henkel), plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX®& 150, a dicyclohexyl phthalate (commercially available from Morflex Chemical Company Inc.), trioctyl trimellitate (commercially available from Eastman Kodak Co.), and the like; and the like. Such additives can be included in conventional amounts for their usual purposes.

The ink composition also includes a carrier material, or mixture of two or more carrier materials. The carrier material can vary, for example, depending upon the specific type of ink composition. For example, an aqueous ink jet ink composition can use water, or a mixture of water and one or more other solvents, as a suitable carrier material. Other ink jet ink compositions can use one or more organic solvents as a carrier material, with or without water.

In the case of a solid (or phase change) ink jet ink composition, the carrier can include one or more organic compounds. The carrier for such solid ink compositions is typically solid at room temperature (about 20° C. to about 25° C.), but becomes liquid at the printer operating temperature for ejecting onto the print surface. Suitable carrier materials for solid ink compositions can thus include, for example, amides, including diamides, triamides, tetra-amides, and the like. Suitable triamides include, for example, those disclosed in U.S. Patent Publication No. 2004-0261656, the entire disclosure of which is incorporated herein by reference. Suitable other amides, such as fatty amides including monoamides, tetra-amides, mixtures thereof, are disclosed in, for example, U.S. Pat. Nos. 4,889,560, 4,889,761, 5,194,638, 4,830,671, 6,174,937, 5,372,852, 5,597,856, and 6,174,937, and British Patent No. GB 2 238 792, the entire disclosures of each are incorporated herein by reference. In embodiments where an amide is used as a carrier material, a triamide is particularly useful because triamides are believed to have structures that are more three-dimensional as compared to other amides such as diamides and tetraamides.

Other suitable carrier materials that can be used in the solid ink compositions include, for example, isocyanate-derived resins and waxes, such as urethane isocyanate-derived materials, urea isocyanate-derived materials, urethane/urea isocyanate-derived materials, mixtures thereof, and the like.

Additional suitable solid ink carrier materials include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

The ink carrier in a solid ink composition can be present in ink in any desired or effective amount. For example, the carrier can be present in an amount of about 0.1 to about 99 percent by weight of the ink, such as about 50 to about 98 percent by weight of the ink, or about 90 to about 95 percent by weight of the ink, although the amount can be outside of these ranges.

In the case of a radiation, such as ultraviolet light, curable ink composition, the ink composition comprises a carrier material that is typically a curable monomer, curable oligomer, or curable polymer, or a mixture thereof. The curable materials are typically liquid at 25° C. The curable ink composition can further include other curable materials, such as a curable wax or the like, in addition to the colorant and other additives described above.

The term "curable" refers, for example, to the component or combination being polymerizable, that is, a material that may be cured via polymerization, including for example free radical routes, and/or in which polymerization is photoinitiated though use of a radiation sensitive photoinitiator. Thus, for example, the term "radiation curable" refers is intended to cover all forms of curing upon exposure to a radiation source, including light and heat sources and including in the presence or absence of initiators. Example radiation curing routes include, but are not limited to, curing using ultraviolet (UV) light, for example having a wavelength of 200-400 nm or more rarely visible light, such as in the presence of photoinitiators and/or sensitizers, curing using e-beam radiation, such as in the absence of photoinitiators, curing using thermal curing, in the presence or absence of high temperature thermal initiators (and which are generally largely inactive at the jetting temperature), and appropriate combinations thereof.

Suitable radiation, such as UV, curable monomers and oligomers include, but are not limited to, acrylated esters, acrylated polyesters, acrylated ethers, acrylated polyethers, acrylated epoxies, urethane acrylates, and pentaerythritol tetraacrylate. Specific examples of suitable acrylated oligomers include, but are not limited to, acrylated polyester oligomers, such as CN2262 (Sartomer Co.), EB 812 (Cytec Surface Specialties), EB 810 (Cytec Surface Specialties), CN2200 (Sartomer Co.), CN2300 (Sartomer Co.), and the like, acrylated urethane oligomers, such as EB270 (UCB Chemicals), EB 5129 (Cytec Surface Specialties), CN2920 (Sartomer Co.), CN3211 (Sartomer Co.), and the like, and acrylated epoxy oligomers, such as EB 600 (Cytec Surface Specialties), EB 3411 (Cytec Surface Specialties), $CN_{22}O_4$ (Sartomer Co.), CN 110 (Sartomer Co.), and the like; and pentaerythritol tetraacrylate oligomers, such as SR399LV (Sartomer Co.) and the like. Specific examples of suitable acrylated monomers include, but are not limited to, polyacrylates, such as trimethylol propane triacrylate, pentaerythritol tetraacrylate, pentaerythritol triacrylate, dipentaerythritol pentaacrylate, glycerol propoxy triacrylate, tris(2-hydroxyethyl) isocyanurate triacrylate, pentaacrylate ester, and the like, epoxy acrylates, urethane acrylates, amine acrylates, acrylic acrylates, and the like. Mixtures of two or more materials can also be employed as the reactive monomer. Suitable reactive monomers are commercially available from, for example, Sartomer Co., Inc., Henkel Corp., Radcure Specialties, and the like.

In embodiments, the at least one radiation curable oligomer and/or monomer can be cationically curable, radically curable, or the like.

The radiation curable monomer or oligomer variously functions as a viscosity reducer, as a binder when the composition is cured, as an adhesion promoter, and as a crosslinking agent, for example. Suitable monomers can have a low molecular weight, low viscosity, and low surface tension and comprise functional groups that undergo polymerization upon exposure to radiation such as UV light.

In embodiments, the monomer is equipped with one or more curable moieties, including, but not limited to, acrylates; methacrylates; alkenes; allylic ethers; vinyl ethers; epoxides, such as cycloaliphatic epoxides, aliphatic epoxides, and glycidyl epoxides; oxetanes; and the like. Examples of suitable monomers include monoacrylates, diacrylates, and polyfunctional alkoxylated or polyalkoxylated acrylic monomers comprising one or more di- or tri-acrylates. Suitable monoacrylates are, for example, cyclohexyl acrylate, 2-ethoxy ethyl acrylate, 2-methoxy ethyl acrylate, 2(2-ethoxyethoxy)ethyl acrylate, stearyl acrylate, tetrahydrofurfuryl acrylate, octyl acrylate, lauryl acrylate, behenyl acrylate, 2-phenoxy ethyl acrylate, tertiary butyl acrylate, glycidyl acrylate, isodecyl acrylate, benzyl acrylate, hexyl acrylate, isooctyl acrylate, isobornyl acrylate, butanediol monoacrylate, ethoxylated phenol monoacrylate, oxyethylated phenol acrylate, monomethoxy hexanediol acrylate, beta-carboxy ethyl acrylate, dicyclopentyl acrylate, carbonyl acrylate, octyl decyl acrylate, ethoxylated nonylphenol acrylate, hydroxyethyl acrylate, hydroxyethyl methacrylate, and the like. Suitable polyfunctional alkoxylated or polyalkoxylated acrylates are, for example, alkoxylated, such as ethoxylated or propoxylated, variants of the following: neopentyl glycol diacrylates, butanediol diacrylates, trimethylolpropane triacrylates, glyceryl triacrylates, 1,3-butylene glycol diacrylate, 1,4-butanediol diacrylate, diethylene glycol diacrylate, 1,6-hexanediol diacrylate, tetraethylene glycol diacrylate, triethylene glycol diacrylate, tripropylene glycol diacrylate, polybutanediol diacrylate, polyethylene glycol diacrylate, propoxylated neopentyl glycol diacrylate, ethoxylated neopentyl glycol diacrylate, polybutadiene diacrylate, and the like.

In embodiments where the ink composition is a radiation curable ink composition, the ink composition includes at least one reactive monomer and/or oligomer. However, other embodiments can include only one or more reactive oligomers, only one or more reactive monomers, or a combination of one or more reactive oligomers and one or more reactive monomers. However, in embodiments, the composition includes at least one reactive (curable) monomer, and optionally one or more additional reactive (curable) monomers and/or one or more reactive (curable) oligomers.

The curable monomer or oligomer in embodiments is included in the ink in an amount of, for example, about 20 to about 90% by weight of the ink, such as about 30 to about 85% by weight of the ink, or about 40 to about 80% by weight of the ink. In embodiments, the curable monomer or oligomer has a viscosity at 25° C. of about 1 to about 50 cP, such as about 1 to about 40 cP or about 10 to about 30 cP. In one embodiment, the curable monomer or oligomer has a viscosity at 25° C. of about 20 cP. Also, in some embodiments, it is desired that the curable monomer or oligomer is not a skin irritant, so that printed images using the ink compositions are not irritable to users.

Also in embodiments where the ink is a radiation curable ink, the composition further comprises an initiator, such as a photoinitiator, that initiates polymerization of curable components of the ink, including the curable monomer and the curable wax. The initiator should be soluble in the composition. In embodiments, the initiator is a UV-activated photoinitiator.

In embodiments, the initiator can be a radical initiator. Examples of suitable radical photoinitiators include ketones such as hydroxycyclohexylphenyl ketones, benzyl ketones, monomeric hydroxyl ketones, polymeric hydroxyl ketones, α-amino ketones, and 4-(2-hydroxyethoxy)phenyl-(2-hydroxy-2-propyl) ketone; benzoins; benzoin alkyl ethers; acyl phosphine oxides, metallocenes, benzophenones, such as 2,4,6-trimethylbenzophenone and 4-methylbenzophenone; trimethylbenzoylphenylphosphine oxides such as 2,4,6-trimethylbenzoyl-diphenyl-phosphine oxide; azo compounds; anthraquinones and substituted anthraquinones, such as, for example, alkyl substituted or halo substituted anthraquinones; other substituted or unsubstituted polynuclear quinines; acetophenones, thioxanthones; ketals; acylphosphines; thioxanthenones, such as 2-isopropyl-9H-thioxanthen-9-one; mixtures thereof; and the like. One suitable ketone is 1-[4-(2-hydroxyethoxy)-phenyl]-2-hydroxy-2-methyl-1-propane-1-one. In an embodiment, the ink contains an α-amino ketone, 1-[4-(2-hydroxyethoxy)-phenyl]-2-hydroxy-2-methyl-1-propane-1-one and 2-isopropyl-9H-thioxanthen-9-one. In another embodiment, the photoinitiator is one of the following compounds or a mixture thereof: a hydroxycyclohexylphenyl ketone, such as, for example, 1-hydroxycyclohexylphenyl ketone, such as, for example, Irgacure® 184 (Ciba-Geigy Corp., Tarrytown, N.Y.), having the structure:

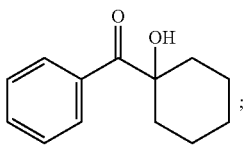

a trimethylbenzoylphenylphosphine oxide, such as, for example, ethyl-2,4,6-trimethylbenzoylphenylphosphinate, such as, for example, Lucirin® TPO-L (BASF Corp.), having the formula

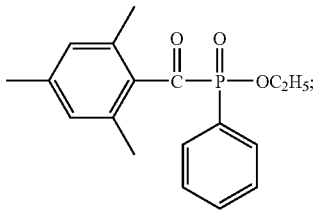

a mixture of 2,4,6-trimethylbenzophenone and 4-methylbenzophenone, such as, for example, SARCURE™ SR1137 (Sartomer); a mixture of 2,4,6-trimethylbenzoyl-diphenylphosphine oxide and 2-hydroxy-2-methyl-1-phenyl-propan-1-one, such as, for example, DAROCUR® 4265 (Ciba Specialty Chemicals); alpha-amino ketone, such as, for example, IRGACURE® 379 (Ciba Specialty Chemicals); 4-(2-hydroxyethoxy)phenyl-(2-hydroxy-2-propyl) ketone, such as, for example, IRGACURE® 2959 (Ciba Specialty Chemicals); 2-isopropyl-9H-thioxanthen-9-one, such as, for example, DAROCUR® ITX (Ciba Specialty Chemicals); and mixtures thereof.

In other embodiments, the initiator can be a cationic initiator. Examples of suitable cationic photoinitiators include aryldiazonium salts, diaryliodonium salts, triarysulfonium salts, triarylselenonium salts, dialkylphenacylsulfonium salts, triarylsulphoxonium salts and aryloxydiarylsulfonium salts.

The total amount of initiator included in the ink may be, for example, about 0.5 to about 15%, such as about 1 to about 10%, by weight of the ink.

The ink, such as the radiation curable ink, may also optionally contain at least one gellant. The gellant can be included, for example, to control the viscosity of the ink composition before and/or after jetting. For example, suitable gellants include a curable gellant comprised of a curable polyamide-epoxy acrylate component and a polyamide component, a curable composite gellant comprised of a curable epoxy resin and a polyamide resin, and the like.

Suitable curable composite gellants include those described in U.S. Pat. Nos. 6,492,458 and 6,399,713, and U.S. Patent Publications Nos. US 2003/0065084, US 2007/0120921, and US 2007/0120924, the entire disclosures of which are incorporated herein by reference. The ink compositions can include the gellant in any suitable amount, such as about 1% to about 50% by weight of the ink. In embodiments, the gellant can be present in an amount of about 2% to about 20% by weight of the ink, such as about 5% to about 15% by weight of the ink, although the value can also be outside of this range.

In the uncured state, the radiation-curable ink composition in embodiments is a low viscous liquid and is readily jettable. For example, in embodiments, the ink has a viscosity of from 8 mPa-s to 15 mPa-s, such as from 10 mPa-to 12 mPa-s, at a temperature between 60° C. and 100° C. In embodiments, the ink has a viscosity of from $10^5$ to $10^7$ mPa-s at a temperature of 50° C. or below, specifically at a temperature from 0° C. to 50° C. Upon exposure to a suitable source of curing energy, e.g., ultraviolet light, electron beam energy, or the like, the photoinitiator absorbs the energy and sets into motion a reaction that converts the liquid composition into a cured material. The monomer and/or oligomer in the composition contain functional groups that polymerize during exposure to the curing source to readily crosslink forming a polymer network. This polymer network provides printed image with, for example, durability, thermal and light stability, and scratch and smear resistance. Thus, the composition is particularly well-suited for ink-based images printed on substrates that may be subjected to heat or sunlight, because the composition provides a printed image that is resistant to cracking and fading and provides image permanence.

In contrast to the curable ink compositions, the solid or phase change ink compositions typically have melting points no lower than about 50° C., such as about 50° C. to about 160° C. or more. In embodiments, the ink compositions have a melting point of about 70° C. to about 140° C., such as about 80° C. to about 100° C., although the melting point can be outside of these ranges. The ink compositions also generally a have melt viscosity at the jetting temperature (such as typically about 75° C. to about 180° C., or about 100° C. to about 150° C. or about 120° C. to about 130° C., although the jetting temperature can be outside of these ranges) typically of about 2 to about 30 centipoise, such as about 5 to about 20 centipoise or about 7 to about 15 centipoise, although the melt viscosity can be outside of these ranges. Because image hardness tends to drop with lower viscosities, it is desired in embodiments that the viscosity be as low as possible while still retaining the desired degree of image hardness.

In embodiments, the radiation-curable ink composition can include a water soluble or dispersable radiation-curable materials, such as polyethylene glycol diacrylates, ethoxylated trimethylolpropane triacrylate, ethoxylated bisphenol A diacrylates, UCECOAT waterborne UV curable resins available from Cytec Surface Specialties. Water dispersible photoinitiators can include Esacure DP250 available from Lamberti SpA. Optional dispersing agents include EFKA 7431 and 7441 available from Ciba Specialty Chemicals.

The ink compositions of the present disclosure can also optionally contain other materials, which may depend upon the type of printer in which the ink is used. For example, the carrier composition is typically designed for use in either a direct printing mode or an indirect or offset printing transfer system.

In embodiments, the present invention can include ink compositions which comprise an aqueous liquid vehicle and the nanoscale-sized pigment composition disclosed herein. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof.

In other embodiments encompassing non-aqueous inks, the nanoscale-sized pigment composition can be used as colorants for solvent-borne inks such as petroleum-based inks which can include aliphatic hydrocarbons, aromatic hydrocarbons, and mixtures thereof, environmentally friendly soy and vegetable oil-based inks, linseed oil-based inks and other ink-based vehicles derived from natural sources. Other examples of ink vehicles for nanopigment particles include isophthalic alkyds, higher order alcohols and the like. In still other embodiments, the present invention of nanopigment particles can be applied towards inks used in relief, gravure, stencil, and lithographic printing.

The ink compositions of the present disclosure can be prepared by any desired or suitable method. For example, in the case of solid or phase change inks, or even curable inks, the ink ingredients can be mixed together, followed by heating, typically to a temperature of from about 100 to about 140° C., although the temperature can be outside of this range, and stirring until a homogeneous ink composition is obtained, followed by cooling the ink to ambient temperature (typically from about 20 to about 25° C.). In the case of liquid ink compositions, the ink ingredients can simply be mixed together with stirring to provide a homogeneous composition, although heating can also be used if desired or necessary to help form the composition.

In addition to ink compositions, the nanoscale-sized pigment composition can be used in a variety of other applications, where it is desired to provide a specific color to the composition. For example, the nanoscale-sized pigment composition can also be used in the same manner as conventional pigments in such uses as colorants for paints, resins, lenses, filters, printing inks, and the like according to applications thereof. By way of example only, the nanoscale-sized pigment composition of embodiments can be used for toner compositions, which include polymer particles and nanoscale pigment particles, along with other optional additives, that are formed into toner particles and optionally treated with internal or external additives such as flow aids, charge control agents, charge-enhancing agents, filler particles, radiation-curable agents or particles, surface release agents, and the like. The toner composition of the present invention can be prepared by a number of known methods including extrusion melt blending of the toner resin particles, nanoscale pigment particles and other colorants and other optional additives, followed by mechanical commination and classification. Other methods include those well known in the art such as spray drying, melt dispersion, extrusion processing, dispersion polymerization, and suspension polymerization. Further, the toner compositions can be prepared by emulsion/aggregation/coalescence processes, as disclosed in references U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418, 108, U.S. Pat. No. 5,364,729, and U.S. Pat. No. 5,346,797. The toner particles can in turn be mixed with carrier particles to form developer compositions. The toner and developer compositions can be used in a variety of electrophotographic printing systems.

An example is set forth herein below and is illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Examples of Compositions and Method of Making Nanosized Monoazo Laked Red Pigment Comparative Example Synthesis of Pigment Red 57:1 by a two-step method (Expt. #30176-50)

Synthesis of Lithol Rubine-Potassium Salt Dye, a precursor to making Pigment Red 57:1 (Expt. # 30176-17)

Diazotization Step: Into a 500 mL round bottom flask equipped with a mechanical stirrer, thermometer, and addition funnel was dissolved 2-amino-5-methylbenzenesulfonic acid (8.82 g) into 0.5M KOH aqueous solution (97.0 mL). The resulting brown solution was cooled to 0° C. A 20 wt % aqueous solution of sodium nitrite ($NaNO_2$; 3.28 g dissolved into 25 mL water) was added slowly to the first solution while maintaining the temperature below 3° C. To the red-brown homogeneous mixture was added dropwise concentrated HCl (10M, 14.15 mL) over 1 hour, maintaining the internal temperature below 2° C. The mixture formed a pale brown suspension, and following complete addition of conc. HCl, the suspension was stirred an additional 30 min.

Coupling Step: In a separate 2-L resin kettle was dissolved 3-hydroxy-2-naphthoic acid (8.86 g) into an aqueous solution of KOH (8.72 g) in water (100 mL). An additional 250 mL of water was added, and the light-brown solution was then cooled to 15° C. while stirring vigorously. The cold suspension of the diazonium salt suspension was then added slowly to the coupling solution while mixing vigorously. The color changed immediately to a dark red solution, and ultimately to a yellowish-red (orange) slurry of precipitated dyestuff. The mixture was stirred for 2 hours while warming up to room temp, then filtered and diluted with about 500 mL of deionized water to produce an orange aqueous slurry of Lithol Rubine-Potassium salt dye having solids content of about 1.6 wt %.

Laking of Lithol Rubine-Potassium Salt Dye to Produce Pigment Red 57:1

Into a 500 mL round bottom flask equipped with mechanical stirrer and condenser was charged 126 g of aqueous slurry of Lithol Rubine-Potassium salt dye from above (Comparative Example) having about 1.6% wt solids content. The pH of the slurry was adjusted to at least 9.0 or higher by addition of 0.5 M KOH solution, after which the dyestuff was fully rendered into homogeneous solution that was dark black-red in color. An aqueous solution of calcium chloride dihydrate (0.5 M solution, 13 mL) was added dropwise to the slurry while stirring vigorously. A red precipitate formed immediately, and after addition was completed, the slurry was stirred for an additional 1 hour. The red slurry was then heated to about 75° C. for 20 min, then cooled to room temp. The slurry was filtered under high vacuum through a 1.2 μm Nylon membrane cloth, then reslurried twice with 200 mL portions of deionized water. The pH and conductivity of the filtrates after each filtration were measured and recorded, with the final wash filtrate having nearly neutral pH of 6.2 and conductivity of about 13.5 μS/cm, indicating low residual salts. The red pigment filtercake was reslurried into about 200 mL of DIW and freeze-dried for 48 hours, to afford a red colored powder (1.95 grams).

Example 1

Synthesis of Lithol Rubine-Potassium Salt Dye, a Precursor to Making Pigment Red 57:1

Diazotization Step: Into a 500 mL round bottom flask equipped with a mechanical stirrer, thermometer, and addition funnel was dissolved 2-amino-5-methylbenzenesulfonic acid (8.82 g) into 0.5M KOH aqueous solution (97.0 mL). The resulting brown solution was cooled to 0° C. A 20 wt % aqueous solution of sodium nitrite ($NaNO_2$; 3.28 g dissolved into 25 mL water) was added slowly to the first solution while maintaining the temperature below 3° C. To the red-brown homogeneous mixture was added dropwise concentrated HCl (10M, 14.15 mL) over 1 hour, maintaining the internal temperature below 2° C. The mixture formed a pale brown suspension, and following complete addition of conc. HCl, the suspension was stirred an additional 30 min.

Coupling Step: In a separate 2-L resin kettle was dissolved 3-hydroxy-2-naphthoic acid (8.86 g) into an aqueous solution of KOH (8.72 g) in water (100 mL). An additional 250 mL of water was added, and the light-brown solution was then cooled to 15° C. while stirring vigorously. The cold suspension of the diazonium salt suspension was then added slowly to the coupling solution while mixing vigorously. The color changed immediately to a dark red solution, and ultimately to a yellowish-red (orange) slurry of precipitated dyestuff. The mixture was stirred for 2 hours while warming up to room temp, then filtered and reslurried with about 500 mL of deionized water to produce an orange aqueous slurry of Lithol Rubine-Potassium salt dye having solids content of about 1.6 wt %.

Example 2

Synthesis of Lithol Rubine-Potassium Salt Dye, a Precursor to Making Pigment Red 57:1

Diazotization Step: Into a 500 mL round bottom flask equipped with a mechanical stirrer, thermometer, and addition funnel was dissolved 2-amino-5-methylbenzenesulfonic acid (12.15 g) into 0.5M KOH aqueous solution (135 mL). The resulting brown solution was cooled to 0° C. A 20 wt % aqueous solution of sodium nitrite ($NaNO_2$; 4.52 g dissolved into 30 mL water) was added slowly to the first solution while maintaining the temperature below −2° C. Concentrated HCl (10M, 19.5 mL) was then slowly added dropwise over 1 hour while maintaining the internal temperature below 0° C. The mixture formed a pale brown suspension and following complete addition of conc. HCl, the suspension was stirred an additional 30 min.

Coupling Step: In a separate 2-L resin kettle was dissolved 3-hydroxy-2-naphthoic acid (12.2 g) into an aqueous solution of KOH (12.0 g) in water (130 mL). An additional 370 mL of water was added, and the pale brown solution was then cooled to about 15° C. while stirring. The cold suspension of the diazonium salt solution was then added slowly to the coupling solution while mixing vigorously. The color change was immediate to dark black-red solution, and ultimately to a yellowish-red (orange) slurry of precipitated dyestuff. The mixture was stirred for at least 2 hours while warming up to room temp, then filtered and reslurried with about 600 mL of deionized water to produce an orange-colored slurry of Lithol Rubine-Potassium salt dye having solids content of about 3.6%-wt.

Example 3

Preparation of Nanosized Particles of Pigment Red 57:1

Into a 500 mL round bottom flask equipped with mechanical stirrer and condenser was charged 126 g of aqueous slurry of Lithol Rubine-Potassium salt dye from above (Example 1) having about 1.6% wt solids content. The pH of the slurry was adjusted to at least 9.0 or higher by addition of 0.5 M KOH solution, after which the dyestuff was fully rendered into homogeneous solution that was dark black-red in color. An aqueous solution 5 wt % Dresinate X (4.0 mL) was added, followed by a solution containing sodium dioctyl sulfosuccinate (0.96 g) dissolved in 100 mL of 90:10 deionized water/THF mixture. No visible change was observed. An aqueous solution of calcium chloride dihydrate (0.5 M solution, 13 mL) was added dropwise to the slurry while stirring vigorously. A red precipitate formed immediately, and after complete addition of the calcium chloride solution, the slurry was stirred for an additional 1 hour. The red slurry was then heated to about 75° C. for 20 min, then cooled to room temp. The slurry was filtered under high vacuum through a 0.45 μm Nylon membrane cloth, then reslurried twice with 75 mL portions of DIW. The pH and conductivity of the final wash filtrate was 7.4 and about 110 μS/cm, respectively, indicating that residual acids and salt by-products were removed. The red pigment filtercake was reslurried in about 250 mL of DIW and freeze-dried for 48 hours to afford a dark red colored powder (2.65 grams). Transmission electron microscopy images of the powder revealed platelet-like particles with particle diameters ranging from 30-150 nm. $^1$H-NMR spectroscopy analysis (300 MHz, DMSO-$d_6$) of the pigment indicated that the pigment adopted the hydrazone tautomer form, and that the dioctyl sulfosuccinate stabilizer compound was present at approximately 40 mol % and associated with a calcium cation (determined by ICP spectroscopy).

Example 4

Preparation of Nanosized Particles of Pigment Red 57:1

The procedure of Example 3 was reproduced. Into a 500 mL round bottom flask equipped with mechanical stirrer and condenser was charged 126 g of aqueous slurry of Lithol Rubine-Potassium salt dye from above (Example 1) having about 1.6% wt solids content. The pH of the slurry was adjusted to at least 9.0 or higher by addition of 0.5 M KOH solution, after which the dyestuff was fully rendered into homogeneous solution that was dark black-red in color. An aqueous solution 5 wt % Dresinate X (4.0 mL) was added, followed by a solution containing sodium dioctyl sulfosuccinate (0.96 g) dissolved in 100 mL of 90:10 deionized water/THF mixture. No visible change was observed. An aqueous solution of calcium chloride dihydrate (0.5 M solution, 13 mL) was added dropwise to the slurry while stirring vigorously. A red precipitate formed immediately, and after complete addition of the calcium chloride solution, the slurry was stirred for an additional 1 hour. The red slurry was then heated to about 75° C. for 20 min, then cooled to room temp. The slurry was filtered under high vacuum through a 0.45 μm Nylon membrane cloth, then reslurried twice with 75 mL portions of DIW. The pH and conductivity of the final wash filtrate was 7.15 and about 155 µS/cm, respectively. The red pigment filtercake was reslurried in about 250 mL of DIW and freeze-dried for 48 hours to afford a dark red-colored powder (2.62 grams). Transmission electron microscopy images of the powder revealed platelet-like particles with particle diameters ranging from 50-175 nm.

Example 5

Preparation of Nanosized Particles of Pigment Red 57:1

Into a 1-L resin kettle equipped with mechanical stirrer and condenser was charged 265 g of aqueous slurry of Lithol Rubine-Potassium salt dye prepared from Example 2, having approximately 3.75%-wt solids content). The pH of the slurry was adjusted to at least 9.0 or higher by addition of 0.5 M KOH solution, after which the dyestuff was fully rendered into homogeneous solution that was dark black-red in color. An aqueous solution 5 wt % Dresinate X (20.0 mL) was added while stirring, followed by a solution containing sodium dioctyl sulfosuccinate (4.8 g) dissolved in 220 mL of 90:10 deionized water/THF mixture was slowly added to the mixture with stirring. An aqueous solution of calcium chloride dihydrate (0.5 M solution, 65 mL) was added dropwise to the slurry while stirring vigorously. A red precipitate formed immediately, and after complete addition of the calcium chloride solution, the slurry was stirred for an additional 1 hour. The red slurry was then heated to about 60° C. for 30 min, then cooled immediately in a cold water bath. The slurry was filtered under high vacuum through a 0.8 micron Versapor membrane cloth (obtained from PALL Corp.), then reslurried twice with about 750 mL portions of DIW, and filtered once more. The pH and conductivity of the final wash filtrate was 7.5 and about 208 µS/cm, respectively. The red pigment filtercake was reslurried in about 600 mL of deionized water and freeze-dried for 48 hours, to afford a dark red-colored powder (12.75 grams). Transmission electron microscopy images of the powder revealed predominantly platelet-like particles with particle diameters ranging from 50-150 nm.

Example 6

Preparation of Nanosized Particles of Pigment Red 57:1

Into a 250 mL round bottom flask equipped with mechanical stirrer and condenser was charged 10 g of aqueous slurry of Lithol Rubine-Potassium salt dye prepared as in Example 2 but having a solids concentration in the aqueous slurry of about 10.0 wt %. The pH of the slurry was adjusted to at least 9.0 or higher by addition of 0.5 M KOH solution, after which the dyestuff was fully rendered into homogeneous solution that was dark black-red in color. An aqueous solution 5 wt % Dresinate X (1.0 mL) was added, followed by a 0.05 mol/L solution (34.5 mL) containing sodium dioctyl sulfosuccinate dissolved in 90:10 deionized water/THF. No visible change was observed. An aqueous solution of calcium chloride dihydrate (1.0 M solution, 2.15 mL) was added dropwise by syringe pump to the slurry while stirring vigorously. A red precipitate formed immediately, and then the slurry was stirred at room temperature for an additional 30 min. The red slurry was then filtered under high vacuum through a 0.8 µm Versapor membrane cloth (obtained from PALL Corp.), then reslurried twice with 50 mL portions of deionized water and filtered each time after reslurrying. The pH and conductivity of the final wash filtrate was 7.5 and about 135 µS/cm, respectively, indicating that residual acids and salt by-products were removed. The red pigment filtercake was reslurried in about 30 mL of deionized water and freeze-dried for 48 hours to afford a dark red colored powder (1.32 grams). Transmission electron microscopy images of the powder revealed very small platelet-like particles with particle diameters ranging from 50-175 nm. $^1$H-NMR spectroscopy analysis (300 MHz, DMSO-$d_6$) of the material indicated that the pigment adopted the hydrazone tautomer form, and that the dioctyl sulfosuccinate stabilizer compound was present at a level ranging from approximately 50-75 mol %.

Example 7

Preparation of Fine and Nanoscale Particles of Pigment Red 57:1

Into a 500 mL round bottom flask equipped with mechanical stirrer and condenser was charged 126 g of aqueous slurry of Lithol Rubine-Potassium salt dye from above (Example 1) having about 1.6% wt solids content. The pH of the slurry was adjusted to at least 9.0 or higher by addition of 0.5 M KOH solution, after which the dyestuff was fully rendered into homogeneous solution that was dark black-red in color. An aqueous solution 5 wt % Dresinate X (4.0 mL) was added, followed by a solution containing sodium dioctyl sulfosuccinate (1.92 g) dissolved in 100 mL of 90:10 deionized water/ THF mixture. No visible change was observed. An aqueous solution of calcium chloride dihydrate (0.5 M solution, 13 mL) was added dropwise to the slurry while stirring vigorously. A red precipitate formed immediately, and after complete addition of the calcium chloride solution, the slurry was stirred for an additional 1 hour. The red slurry was then heated to about 75° C. for 20 min, then cooled to room temp. The slurry was filtered under high vacuum through a 0.45 µm Nylon membrane cloth, then reslurried twice with 75 mL portions of DIW. The pH and conductivity of the final wash filtrate was 7.75 and conductivity of about 500 µS/cm. The red pigment filtercake was reslurried in about 250 mL of DIW and freeze-dried for 48 hours to afford a dark red-colored powder (2.73 grams). Transmission electron microscopy images of the powder showed a wide distribution of particle sizes, ranging from 50 to 400 nm and having particle morphologies that were predominantly platelets.

Example 8

Preparation of Fine and Nanosized Particles of Pigment Red 57:1

The sterically bulky stabilizer compound used was potassium salt of 2-hexyldecanoic acid, prepared by treatment of 2-hexyldecanoic acid with potassium hydroxide dissolved in THF, after which the THF solvent was removed. Into a 500-mL round-bottom flask equipped with condenser and mechanical stirrer was charged 126 g of aqueous slurry of Lithol Rubine-Potassium salt from above (Example 1) having about 1.6% wt solids content. The pH of the slurry was adjusted to at least 9.0 or higher by addition of 0.5 M KOH solution, after which the dyestuff was fully rendered into homogeneous solution that was dark black-red in color. An aqueous solution 5 wt % Dresinate X (4.0 mL) was added, followed by a solution containing potassium 2-hexyldecanoate (1.28 g) dissolved in 100 mL of 80:20 deionized water/THF mixture, added dropwise while stirring vigorously. An aqueous solution of calcium chloride dihydrate (0.5

M solution, 13 mL) was added to the slurry while stirring vigorously causing a bluish-red pigment precipitate to form. The slurry was stirred for 1 hour, heated to about 75° C. for 20 min, then cooled to room temperature. The slurry was filtered under high vacuum through a 0.8 μm Nylon membrane cloth, then reslurried once with 150 mL of DIW and filtered again. The pH and conductivity of the final wash filtrate was pH 8.38 and conductivity of about 63 μS/cm. The red pigment 57:1 filtercake was reslurried into about 150 mL of DIW and freeze-dried for 48 hours to afford a red powder (2.95 grams). TEM micrograph images showed a wide distribution of particle sizes, ranging from 50 to 400 nm and having particle morphologies that included platelets as well as rods.

Examples of Pigment Dispersions and Properties

Example 9

Preparation of Liquid Pigment Dispersions and Polymer Coatings

A series of liquid non-aqueous dispersions were prepared using a polymeric dispersant and the nanosized PR 57:1 pigments from Examples 3, 4, 5, 6, 7, and 8; the larger-sized pigment particles prepared in the Comparative Example; as well as two commercial sources of PR 57:1 obtained from Clariant (lot #L7B01) and Aakash. Coatings on clear Mylar film were prepared from these liquid dispersions, and evaluated in the following manner: Into a 30 mL amber bottle was added 0.22 g of pigment, 0.094 g polyvinylbutyral (B30HH obtained from Hoescht), 7.13 g n-butyl acetate (glass-distilled grade, obtained from Calcdon Laboratories) and 70.0 g of ⅛" stainless steel shot (Grade 25 440C obtained from Hoover Precision Products). The bottles were transferred to a jar mill and were allowed to gently mill for 4 days at 100 RPM. Two draw-down coatings were obtained for each dispersion using an 8-path gap on clear Mylar☐ film such that the wet thicknesses for each coating comprised of PR 57:1 pigment sample were 0.5 and 1 mil. The air-dried coatings on clear Mylar☐ film were then dried in a horizontal forced-air oven at 100 ☐C for 20 minutes.

Example 10

Evaluation of Coatings prepared from Liquid Pigment Dispersions—

The coatings on clear Mylar☐ film prepared as described in Example 9 were assessed for coloristic and light scattering properties in the following manner: The UV/VIS/NIR transmittance spectra of each coating were obtained using a Shimadzu UV160 spectrophotometer, and the results showed dramatically reduced light scattering and remarkable specular reflectivity for the nanosized PR 57:1 pigment samples described herein, compared with the spectra of coatings prepared with commercial PR 57:1 pigment samples obtained from Clariant and Aakash. The degree of light scattering in a coating is dependent on both the size and shape distributions of the pigment particles and their relative dispersability within the coating matrix, and the Normalized Light Scatter Index (NLSI) was developed to be a measure of this characteristic for the pigmented coatings. NLSI is quantified by first measuring the spectral absorbance of the coating in a region where there is no absorbance from the chromogen of the monoazo laked pigment (for PR 57:1, a suitable region is 700-900 nm), but only absorbance due to light scattered from large aggregates and/or agglomerated pigment particles dispersed in the coating binder. The Normalized Light Scatter Index (NLSI) is then obtained by normalizing each of the samples' light scattering indices (from 700 to 900 nm) to a lambda-max optical density=1.5. In this way, the degree of light scattering for each pigmented coating could be compared directly against each other. The lower the NLSI value, the smaller the inferred particle size of the dispersed pigment in the coating. A relationship between decreasing average particle size and decreasing NLSI value was found to exist with the coatings prepared from the example pigments shown in Table 8. In particular, the nanosized monoazo laked pigment PR 57:1 of Example 3 had by far the lowest degree of light scattering, with an NLSI value of 0.3. The coloristic properties of the Mylar, coatings were determined using an X-RITE 938 spectrodensitometer. L* a* b* and optical density (O.D.) values were obtained for each of the samples, and the L* a* b* were normalized to an optical density of 1.5, and used to calculate the hue angle and chroma (c*), as listed in Table 8.

TABLE 8

Normalized Light Scatter Indices (NLSI) and Coloristic properties of example PR 57:1 pigments, normalized to O.D. = 1.5

| Metric | Clariant L7B 01 | Aakash PR57:1 | Comparative Example | Example 7 | Example 3 | Example 8 | Example 4 | Example 5 | Example 6 |
|---|---|---|---|---|---|---|---|---|---|
| L* | 47.9 | 48.0 | 44.8 | 49.9 | 50.8 | 49.6 | 50.6 | 51.7 | 53.0 |
| a* | 71.1 | 71.2 | 71.5 | 76.7 | 76.5 | 73.6 | 77.2 | 79.4 | 78.8 |
| b* | 8.7 | 17.5 | 34.8 | −18.9 | −16.4 | 1.4 | −17.4 | −18.8 | −15.0 |
| Hue Angle (°) | 6.6 | 13.8 | 28.1 | 346.1 | 347.9 | 0.9 | 347.1 | 346.6 | 349.2 |
| C* | 72.6 | 73.4 | 78.1 | 78.9 | 78.6 | 73.9 | 77.5 | 81.3 | 80.5 |
| Normalized Light Scatter Index | 5.5 | 9.9 | 74.1 | 0.9 | 0.3 | 4.8 | 1.3 | 1.0 | 0.7 |

Example 11 b*a* Coloristic Properties of Coatings prepared from Liquid Pigment Dispersions

Figure 2:
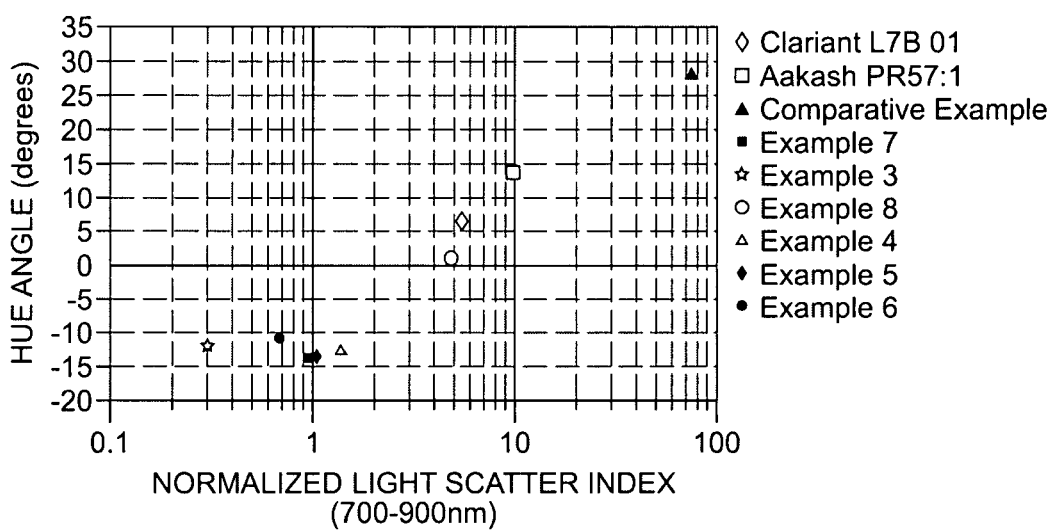
FIG. 2 shows a relationship between hue angle and normalized light scatter index (NLSI) for pigmented coatings prepared according to embodiments.

The graphs in FIGS. 1 and 2 visually illustrate the tremendous shifts in b* a* gamut observed with coatings prepared with the nanosized PR 57:1 pigments from Examples 3,4,5,6, and 7, in addition to the extended c* chroma for the nanosized pigment examples. Furthermore, the graph in FIG. 1 shows a clear blue-shifting of hue that directly corresponds to decreasing particle size/particle diameters of the example PR 57:1 pigments, a relationship which is also inferred from the Normalized Light Scatter Index (NLSI) values of Table 8.

(Note: For ease of generating the graph, the b* vertical axis shows "negative" hue angles, which represent the number of degrees <360 degrees.) The light scattering and coloristic data accumulated provide evidence for the ability to tune color properties and specular reflectivity of pigmented coatings with tunable particle size of surface-enhanced pigment particles, by way of a facile bottom-up chemical process for making monoazo laked pigments, in particular Pigment Red 57:1, using sterically bulky stabilizer to limit particle aggregation and therefore limit particle size as well as enhance dispersion characteristics. Furthermore, the ability to easily tune color properties of such monoazo laked pigments provides a means to control the color quality so that inexpensive azo laked pigments like PR 57:1 can be used to obtain magenta color that are normally exhibited by higher cost red pigments, such as the quinacridone Pigment Red 122 and Pigment Red 202.

Example 12

Composition of UV-Curable Liquid Pigment Dispersion Containing Nanosized Pigment Several dispersions were made using the PR 57:1 example pigment as described in Example 5. In a 30 mL amber bottle, 0.129 g Solsperse 34750 (50% active dispersant component in ethyl acetate, available from Noveon) were added to 8.14 g SR-9003 (propoxylated neo-pentyl glycol diacrylate, available from Sartomer Corporation) and mixed to allow dissolution of the dispersant. To the bottle was added 70.0 g of ⅛" 440C Grade 25 stainless steel balls (available from Hoover Precision Products) followed by 0.252 g of nanosized PR 57:1 pigment as prepared in Example 5. Another dispersion preparation was prepared in an identical manner except 0.336 g of Solsperse 34750 was used. The bottles were transferred to a jar mill where they were ball-milled for 4 days at ~120 RPM. At the end of the milling cycle, aliquots from the resultant dispersions showed excellent flow behavior and thermal stability at 85° C. where no particle settling was observed for at least 3 weeks.

Example 13

Composition of UV-Curable Liquid Pigment Dispersion Containing Nanosized Pigment (by Attrition Technique)

1800.0 g of ⅛" 440C Grade 25 stainless steel balls (available from Hoover Precision products) were added to a jacketed Szegvari 01 attritor, followed by a prepared solution of 5.52 g Solsperse 34750 dispersant in 165.83 g SR-9003 monomer. 5.13 g of the nanosized PR 57:1 pigment as described in Example 5 were then slowly added to the attritor. The attritor motor speed was adjusted so that the impeller tip speed was ~6.5 cm/s. The dispersion was attrited for 19 hours. The attritor was kept cool at 20° C. by a recirculating bath. For recovery of the dispersion in the attritor, a solution of 0.76 g Solsperse 34750 in 27.71 g SR-9003 was slowly added dropwise to the attritor with the impeller now turning at 200 RPM. 290.4 g of ⅛" 440C Grade 25 stainless steel balls were slowly added to the attritor during this mixing interval to maintain the same volume of stainless steel balls to liquid vehicle. The diluted dispersion was allowed to attrite for 3 hours. 178.9 g of the dispersion was recovered from the attritor once separated from the stainless steel balls.

Example 14

Filtration of Attrited UV-Curable Liquid Pigment Dispersion

The attrited dispersion from Example 13 was filtered in order to quantitatively ascertain the degree of dispersion and the dispersion stability. 150 g of the recovered attrited dispersion was filtered at 85°C past a 2 µm absolute glass fiber filter (available from Pall Corporation) in a 70 mm Mott filtration apparatus (available from Mott Corporation) using 2 psid applied pressure of Nitrogen. The dispersion was then filtered at 85°C past a 1 µm absolute glass fiber filter (available from Pall Corporation) in a 47 mm KST filtration apparatus (available from Advantec Corporation) using 40 KPa applied pressure of Nitrogen. The filtration data of permeate weight over time in 1 second intervals was recorded by computer. The dispersion permeate past 1 µm filter was allowed to remain standing for 12 days at room temperature upon which time it was re-filtered past a 1 µm absolute glass fiber filter at 85°C. The filtration times of the as-prepared and 12-day aged dispersions were 16 and 14 seconds, respectively.

Example 15

Thermal Stability of Attrited UV-Curable Liquid Pigment Dispersions 1 g aliquots of the pigment dispersions prepared in Example 13 were held in an oven at 85° C. and were observed to be stable for 3 to 4 weeks with no indication of pigment particle settling nor apparent change in viscosity. 1 g aliquots of the same pigment dispersions prepared in Example 13 were left to stand at room temperature, and were observed to be stable beyond 18 months with no indication of settling or change in viscosity.

Example 16

Composition of UV Curable Ink Containing Nanosized Pigment

I. Preparation of UV-Curable Liquid Pigment Dispersion by Attrition 1800.0 g ⅛" 440C Grade 25 stainless steel balls (available from Hoover Precision products) are added to a jacketed Szegvari 01 attritor followed by a pre-dissolved solution of 13.40 g Solsperse 34750 in 165.83 g SR-9003 (propxylated neopentyl glycol diacrylate, available from Sartomer Company). 20.10 g of nanosized PR 57:1 pigment sample obtained from two replicate batches prepared as in Example 4 was slowly added to the attritor. The attritor motor speed is adjusted so that the impeller is turning at 150 RPM. The attritor is kept cool at 20 C by a recirculating bath, and is allowed to stir at 150 RPM overnight. For recovery of the dispersion in the attritor, a solution of 1.47 g Solsperse 34750 in 35.23 g SR-9003 is slowly added dropwise to the attritor with the impeller now turning at 200 RPM. 308.1 g of ⅛" 440C Grade 25 stainless steel balls are slowly added to the attritor during this mixing interval as the solution is added to maintain the same volume of stainless steel balls to liquid vehicle. The diluted dispersion is allowed to attrite for 3 hours. The dispersion is recovered from the attritor and separated from the steel balls.

II. Preparation of UV-Curable Ink Composition with Nanosized Pigment

For the making of a working UV ink, a homogeneous solution consisting of 20.00 g SR-9003, 10.00 g Xerox-proprietary amide gallant (U.S. Patent Publication No. 2007/0123722, the entire disclosure of which is incorporated herein by reference), 2.45 g Darocur ITX, 3.71 g Irgacure 127, 1.21 g Irgacure 819, 3.71 g Irgacure 379, and 0.24 g Irgastab UV10 (all of which are available from Ciba Geigy) is made at 85 C. 110.0 g of the dispersion described above in this example is placed in a 600 mL glass beaker in an oven at 85° C. and is diluted with 41.32 g of the UV-curable homogeneous solution in this example and mixed for 2 hours. The resulting UV-curable gel ink composition comprised of nanosized PR 57:1 pigment shows nearly Newtonian behavior by shear rate sweep determination using an RFS-3 rheometer from Rheometrics Scientific, indicating the nanoparticles in the UV ink are properly dispersed.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A nanoscale pigment particle composition, comprising:
   an organic monoazo laked pigment having at least one functional moiety, and
   a sterically bulky stabilizer compound having at least one functional group,
   wherein the functional moiety associates non-covalently with the functional group; and
   presence of the associated stabilizer limits an extent of particle growth and aggregation, to afford nanoscale-sized pigment particles.

2. The composition of claim 1, wherein the nanoscale-sized pigment particles have an average particle diameter as derived from transmission electron microscopy imaging, of less than about 150 nm.

3. The composition of claim 1, wherein the at least one functional moiety of the organic monoazo laked pigment is selected from the group consisting of sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary or secondary amides, primary or secondary amines, hydroxyl, ketone, aldehyde, oxime, hydroxylamino, enamines (or Schiff base), porphyrins, (phthalo)cyanines, urethane or carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, and indenones.

4. The composition of claim 1, wherein the organic monoazo laked pigment comprises a diazonium component linked to a coupling component through an azo or hydrazone group, with a counterion.

5. The composition of claim 4, wherein the coupling component is selected from the group consisting of β-naphthol and derivatives thereof, naphthalene sulfonic acid derivatives, pyrazolone derivatives, and acetoacetic arylide derivatives.

6. The composition of claim 4, wherein the counterion is selected from the group consisting of metals, non-metals, and carbon-based cations or anions.

7. The composition of claim 1, wherein the at least one functional group of the sterically bulky stabilizer is selected from the group consisting of sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary or secondary amides, primary or secondary amines, hydroxyl, ketone, aldehyde, oxime, hydroxylamino, enamines (or Schiff base), porphyrins, (phthalo)cyanines, urethane or carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, and indenones.

8. The composition of claim 1, wherein the sterically bulky stabilizer comprises at least one aliphatic hydrocarbon moiety.

9. The composition of claim 1, further comprising a surfactant selected from the group consisting of derivatives of rosin natural products; acrylic-based polymers; styrene-based copolymers; copolymers of α-olefins; copolymers of vinyl pyridine, vinyl imidazole, and vinyl pyrrolidinone; polyester copolymers; polyamide copolymers; and copolymers of acetals and acetates.

10. The composition of claim 1, wherein the non-covalent association between the organic monoazo laked pigment and the sterically bulky stabilizer compound is at least one of van der Waals' forces, ionic bonding, coordination bonding, hydrogen bonding, and aromatic pi-stacking bonding.

11. The composition of claim 1, wherein the nanoscale-sized monoazo laked pigment composition has coloristic properties that are changeable as a function of particle size of the nanoscale-sized articles.

12. The composition of claim 11 wherein the coloristic properties are selected from L*, a*, b*, hue, chroma, and NLSI value.

13. The composition of claim 1, wherein the nanoscale-sized monoazo laked pigment composition has enhanced chroma as compared to a similar organic monoazo laked pigment not having the sterically bulky stabilizer compound and not being of nanoscale-size.

14. The composition of claim 1, wherein when the nanoscale pigment particle composition is dispersed in a poly(vinyl butyral-co-vinyl alcohol-co-vinyl acetate) polymer binder, a coating formed from the dispersion has a hue angle measured within a range spanning from about 345° to about 0° on a 2-dimensional b* a* magenta color gamut space.

15. The composition of claim 1, wherein when the nanoscale pigment particle composition is dispersed in a poly(vinyl butyral-co-vinyl alcohol-co-vinyl acetate) polymer binder, the pigment exhibits a NLSI value of from about 0.01 to about 3.

16. The composition of claim 1, wherein the sterically bulky stabilizer is selected from the group consisting of the following compounds:

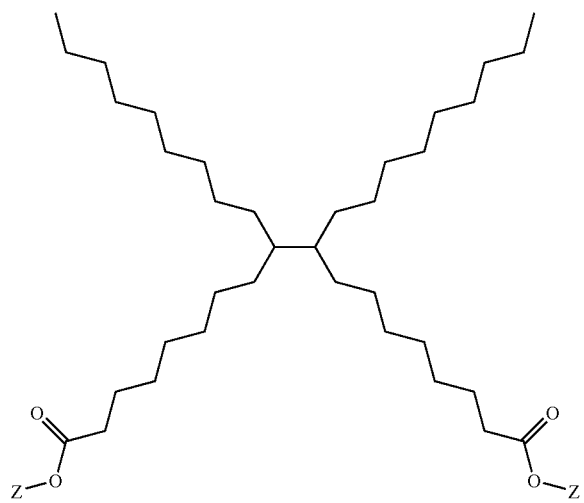

wherein Z is H, a metal cation, or an organic cation;

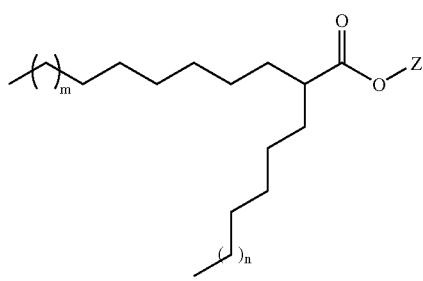

wherein Z is H, a metal cation, or an organic cation, and m+n>1;

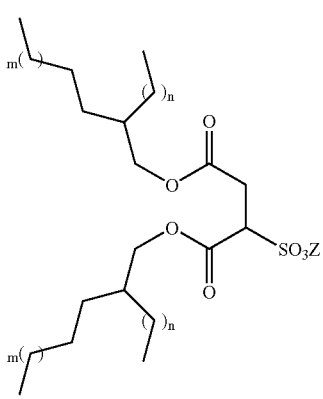

wherein Z is H, a metal cation, or an organic cation, and m+n>1 per branch;

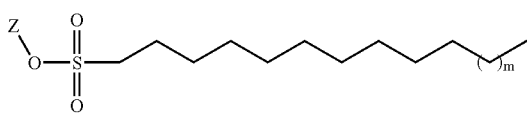

wherein Z is H, a metal cation, or an organic cation, and m≧1;

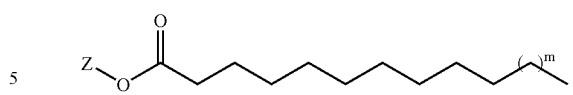

wherein Z is H, a metal cation, or an organic cation, and m≧1; and

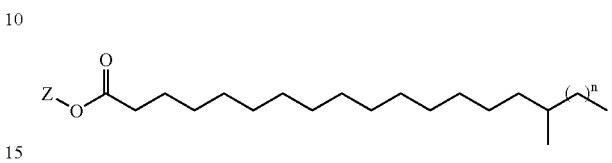

wherein Z is H, a metal cation, or an organic cation, and n≧1.

17. The composition of claim 4, wherein the diazo component is a compound of Formula (2):

Formula (2)

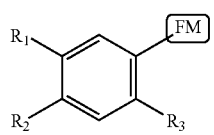

where $R_1$, $R_2$, and $R_3$ independently represent H, a straight or branched alkyl group of from about 1 to about 10 carbon atoms, halogen, $NH_2$, $NO_2$, $CO_2H$, or $CH_2CH_3$; and FM represents $SO_3H$, —C(=O)—NH-Aryl-$SO_3^-$ (where the aryl group can be unsubstituted or substituted with either halogens or alkyl groups having from about 1 to about 10 carbons), $CO_2H$, halogen, $NH_2$, or —C(=O)—$NH_2$, or is a compound of Formula (3):

Formula (3)

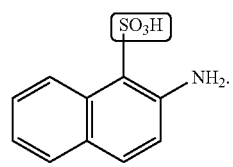

18. The composition of claim 17, wherein the diazo component is selected from the group consisting of the following compounds of Formula (2) wherein:
FM is $SO_3H$, $R_1$ is $CH_3$, $R_2$ is H, and $R_3$ is $NH_2$,
FM is $SO_3H$, $R_1$ is $CH_3$, $R_2$ is Cl, and $R_3$ is $NH_2$,
FM is $SO_3H$, $R_1$ is Cl, $R_2$ is $CH_3$, and $R_3$ is $NH_2$,
FM is $SO_3H$, $R_1$ is Cl, $R_2$ is $CO_2H$, and $R_3$ is $NH_2$,
FM is $SO_3H$, $R_1$ is Cl, $R_2$ is $CH_2CH_3$, and $R_3$ is $NH_2$,
FM is $SO_3H$, $R_1$ is Cl, $R_2$ is Cl, and $R_3$ is $NH_2$,
FM is $SO_3H$, $R_1$ is H, $R_2$ is $NH_2$, and $R_3$ is H,
FM is $SO_3H$, $R_1$ is H, $R_2$ is $NH_2$, and $R_3$ is $CH_3$,
FM is $SO_3H$, $R_1$ is $NH_2$, $R_2$ is H, and $R_3$ is Cl,
FM is $SO_3H$, $R_1$ is H, $R_2$ is H, and $R_3$ is $NH_2$,
FM is $SO_3H$, $R_1$ is H, $R_2$ is $NH_2$, and $R_3$ is H,
FM is $SO_3H$, $R_1$ is $NO_2$, $R_2$ is $NH_2$, and $R_3$ is H,
FM is —C(=O)—NH-Phenyl-$SO_3^-$, $R_1$ is $NH_2$, $R_2$ is $CH_3$, and $R_3$ is H,
FM is $CO_2H$, $R_1$ is H, $R_2$ is H, and $R_3$ is $NH_2$,
FM is Cl, $R_1$ is H, $R_2$ is H, and $R_3$ is $NH_2$,
FM is $NH_2$, $R_1$ is $CH_3$, $R_2$ is H, and $R_3$ is H, FM is NH₂, R₁ is H, R₂ is CH₃, and R₃ is H,
FM is —C(=O)NH₂, R₁ is NH₂, R₂ is CH₃, and R₃ is H,
FM is —C(=O)NH₂, R₁ is H, R₂ is NH₂, and R₃ is H, and
FM is NH₂, R₁ is H, R₂ is H, and R₃ is H.

19. The composition of claim 4, wherein the coupling component is selected from the group consisting of compounds of Formulas (4)-(8), wherein * denotes a point of coupling or attachment to the azo or hydrazone group:

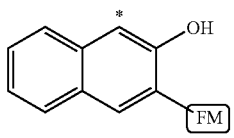

Formula (4)

where FM represents H, CO₂H, SO₃H, —C(=O)—NH-Aryl-SO₃⁻ where the aryl group can be unsubstituted or substituted with either halogens, or alkyl groups having from about 1 to about 10 carbons, CO₂H, halogen, NH₂, —C(=O)—NH₂, substituted benzamides of the formula:

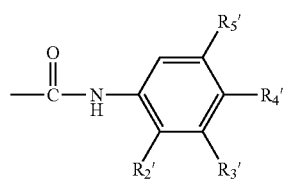

wherein groups R₂' R₃', R₄' and R₅' can independently be H, alkyl groups having from about 1 to 10 carbons, alkoxyl groups, hydroxyl or halogens, or nitro NO₂; or benzimidazolone amides of the formula:

Formula (5)

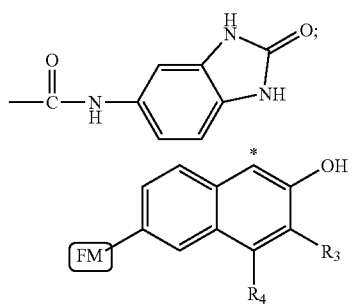

where FM represents SO₃H, CO₂H, or —C(=O)—NH-Aryl-SO₃⁻ where the aryl group can be unsubstituted or substituted with either halogens, or alkyl groups having from about 1 to about 10 carbons, CO₂H, halogens, NH₂, or —C(=O)—NH₂ groups, and R₃ and R₄ independently represent H, or SO₃H;

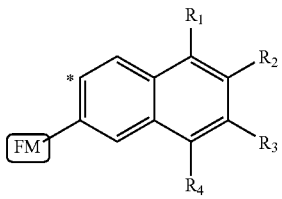

Formula (6)

where FM represents SO₃H, CO₂H, or —C(=O)—NH-Aryl-SO₃⁻ where the aryl group can be unsubstituted or substituted with either halogens, or alkyl groups having from about 1 to about 10 carbons, CO₂H, halogens, NH₂, or —C(=O)—NH₂; and R₁, R₂, R₃ and R₄ independently represent H, SO₃H, or —C(=O)—NH-Phenyl;

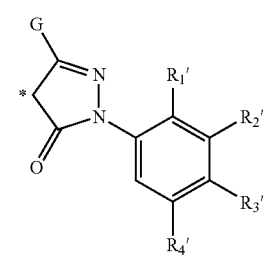

Formula (7)

where G represents CO₂H, straight or branched alkyl having from 1 to about 10 carbons atoms; and R₁', R₂', R₃' and R₄' independently represent H, halogens, SO₃H, nitro (NO₂) or alkoxyl groups; and

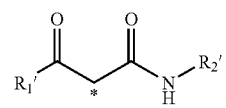

Formula (8)

where R₁' represents a straight or branched alkyl group having from 1 to about 10 carbon atoms, R₂' represents

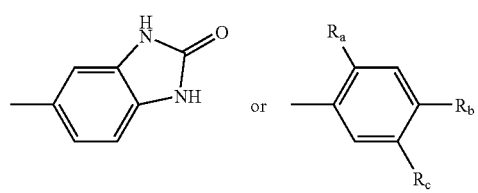

where each of $R^a$, $R^b$, and $R^c$ independently represents H, a straight or branched alkyl group having from 1 to about 10 carbon atoms, OCH₃, or halogens.

20. A process for preparing nanoscale-sized monoazo laked pigment particles, comprising:
- preparing a first reaction mixture comprising: (a) a diazonium salt having at least one functional moiety as a first precursor to the laked pigment and (b) a liquid medium containing diazotizing agents; and
- preparing a second reaction mixture comprising: (a) a coupling agent having at least one functional moiety as a second precursor to the laked pigment and (b) a sterically bulky stabilizer compound having one or more functional groups that associate non-covalently with the coupling agent; and (c) a liquid medium
- combining the first reaction mixture into the second reaction mixture to form a solution and
- effecting a direct coupling reaction which forms a monoazo laked pigment composition wherein the functional moiety associates non-covalently with the functional group and having nanoscale particle size.

21. The process of claim 20, wherein the second reaction mixture further comprises one or more additives selected from the group consisting of inorganic and organic buffers, alkaline bases, and acids.

22. The process of claim 20, wherein the combining is conducted at ambient temperature with high-speed stirring.

23. A process for preparing nanoscale monoazo laked pigment particles, comprising:
- providing a monoazo precursor dye to the monoazo laked pigment that has at least one functional moiety;
- subjecting the monoazo precursor dye to an ion exchange reaction with a metal cation salt in the presence of a sterically bulky stabilizer compound having one or more functional groups; and
- precipitating the monoazo laked pigment as nanoscale particles, wherein the functional moiety of the pigment associates non-covalently with the functional group of the stabilizer and having nanoscale particle size.

24. An ink composition comprising:
a carrier, and
a colorant comprising a nanoscale pigment particle composition according to claim 1.

25. The ink composition of claim 24, wherein the carrier is present in an amount of about 50 to about 99.9 weight %, and said colorant is present in an amount of about 0.1 to about 50 weight % by weight of the ink.

26. The ink composition of claim 24, wherein the carrier comprises one or more organic compounds that are solid at room temperature but becomes liquid at a printer operating temperature for ejecting the ink composition onto a print surface.

27. The ink composition of claim 24, wherein the carrier is selected from the group consisting of amides, isocyanate-derived resins and waxes, paraffins, microcrystalline waxes, polyethylene waxes, ester waxes, amide waxes, fatty acids, fatty alcohols, fatty amides, sulfonamide materials, resinous materials made from different natural sources, and synthetic resins, oligomers, polymers and copolymers, and mixtures thereof.

28. The ink composition of claim 24, wherein the carrier comprises a curable material selected from the group consisting of radiation curable monomers, radiation curable oligomers, radiation curable polymers, and mixtures thereof, that is liquid at room temperature.

29. The ink composition of claim 24, wherein the ink composition is selected from the group consisting of solid ink compositions, phase change ink compositions, curable ink compositions, aqueous ink compositions, and non-aqueous ink compositions.

30. The ink composition of claim 24, further comprising at least one additive selected from the group consisting of surfactants, light stabilizers, UV absorbers, optical brighteners, thixotropic agents, dewetting agents, slip agents, foaming agents, antifoaming agents, flow agents, oils, plasticizers, binders, electrically conductive agents, fungicides, bactericides, organic and inorganic filler particles, leveling agents, opacifiers, antistatic agents, dispersants, and mixtures thereof.

31. The ink composition of claim 24, where the colorant consists of said nanoscale pigment particle composition, and said nanoscale pigment particle composition is the only colorant present in the ink composition.

32. The ink composition of claim 24, where the colorant comprises said nanoscale pigment particle composition and at least one other colorant material.

* * * * *